(12) United States Patent
Horie

(10) Patent No.: US 7,065,261 B1
(45) Date of Patent: Jun. 20, 2006

(54) IMAGE PROCESSING DEVICE AND IMAGE PROCESSING METHOD FOR CORRECTION OF IMAGE DISTORTION

(75) Inventor: Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/531,494

(22) Filed: Mar. 20, 2000

(30) Foreign Application Priority Data

Mar. 23, 1999 (JP) ................................. 11-078214
Jun. 30, 1999 (JP) ................................. 11-185967

(51) Int. Cl.
*G06K 9/36* (2006.01)

(52) U.S. Cl. ...................................... 382/289; 382/296

(58) Field of Classification Search ............... 382/289, 382/296, 260, 199, 176, 295, 174, 100, 312; 353/69, 70; 355/25, 39, 47, 52; 348/240.3, 348/63; 358/3.26
See application file for complete search history.

(56) References Cited

U.S. PATENT DOCUMENTS

| | | | |
|---|---|---|---|
| 5,452,374 A * | 9/1995 | Cullen et al. ................ 382/293 |
| 5,528,194 A | 6/1996 | Ohtani et al. ................ 382/293 |
| 5,832,110 A * | 11/1998 | Hull ............................ 382/168 |
| 5,940,128 A * | 8/1999 | Morimura ................ 348/240.3 |
| 5,940,544 A * | 8/1999 | Nako .......................... 382/293 |
| 6,011,857 A * | 1/2000 | Sowell et al. ............... 382/100 |
| 6,111,984 A * | 8/2000 | Fukasawa ................... 382/209 |
| 6,148,115 A * | 11/2000 | Mackinnon et al. ........ 382/266 |
| 6,367,933 B1 * | 4/2002 | Chen et al. ................... 353/69 |
| 6,418,244 B1 * | 7/2002 | Zhou et al. ................. 382/306 |
| 6,522,390 B1 * | 2/2003 | Suzuki et al. ................. 355/53 |

FOREIGN PATENT DOCUMENTS

| JP | 05344318 A | 12/1993 |
| JP | 07141465 | 6/1995 |
| JP | 10074239 A | 3/1998 |
| JP | 10-200836 | 7/1998 |

* cited by examiner

*Primary Examiner*—Yon J. Couso
(74) *Attorney, Agent, or Firm*—Buchanan Ingersoll PC

(57) ABSTRACT

For finding an inclination of an image rapidly and correctly, an image processing device includes a CCD picking up an image, an edge detection unit detecting an edge of an image relating to the picked-up image, a rotation unit rotating the detected edge in an image plane, an operation unit deriving a characteristic amount of rotated edge and an inclination detection unit detecting an inclination of the picked-up image based on the derived characteristic amount.

19 Claims, 28 Drawing Sheets

F I G. 1 2
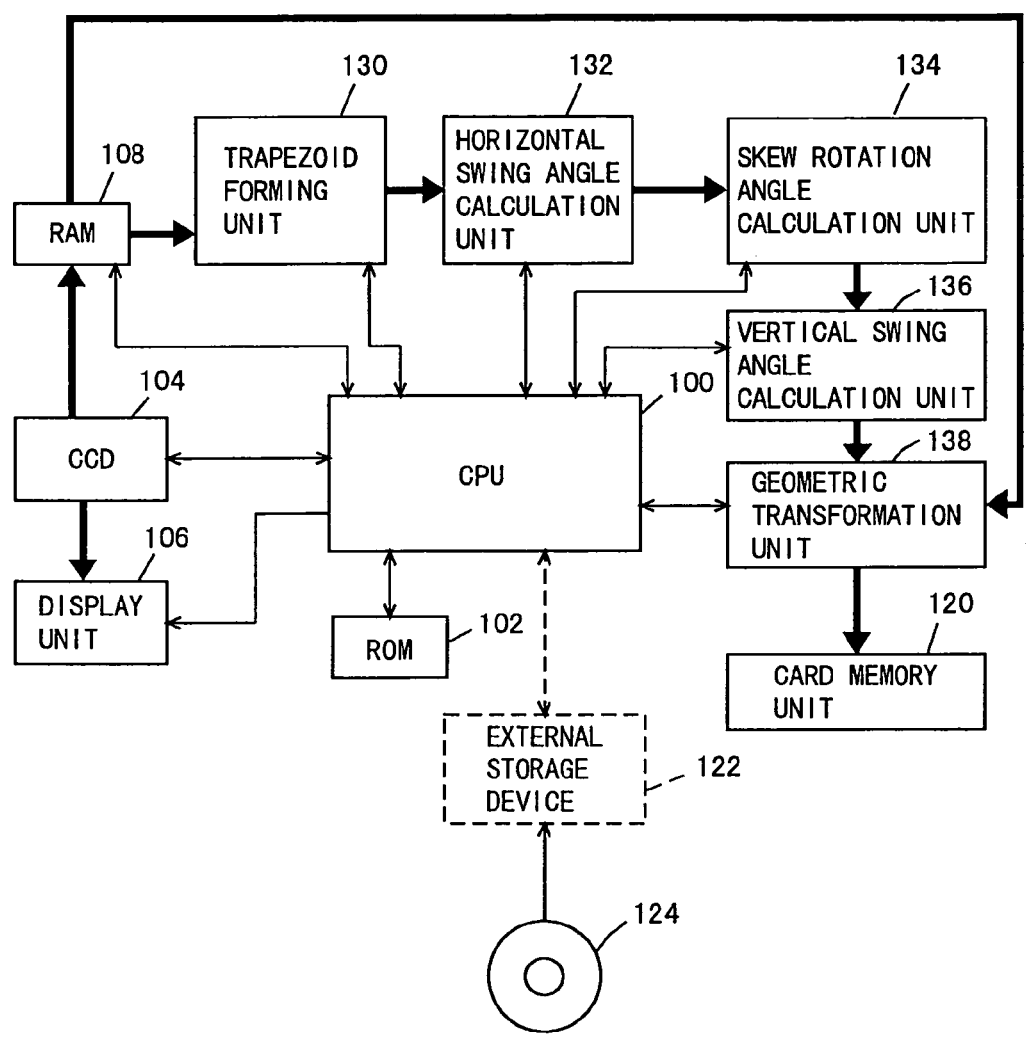

F I G. 1 3
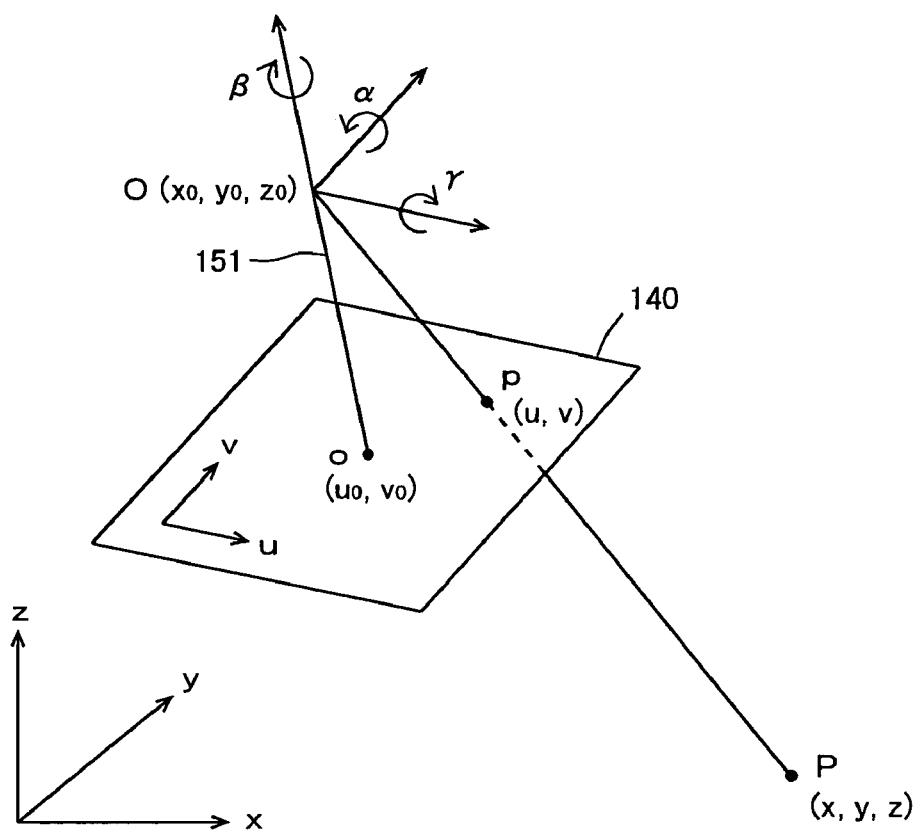

F I G. 1 5
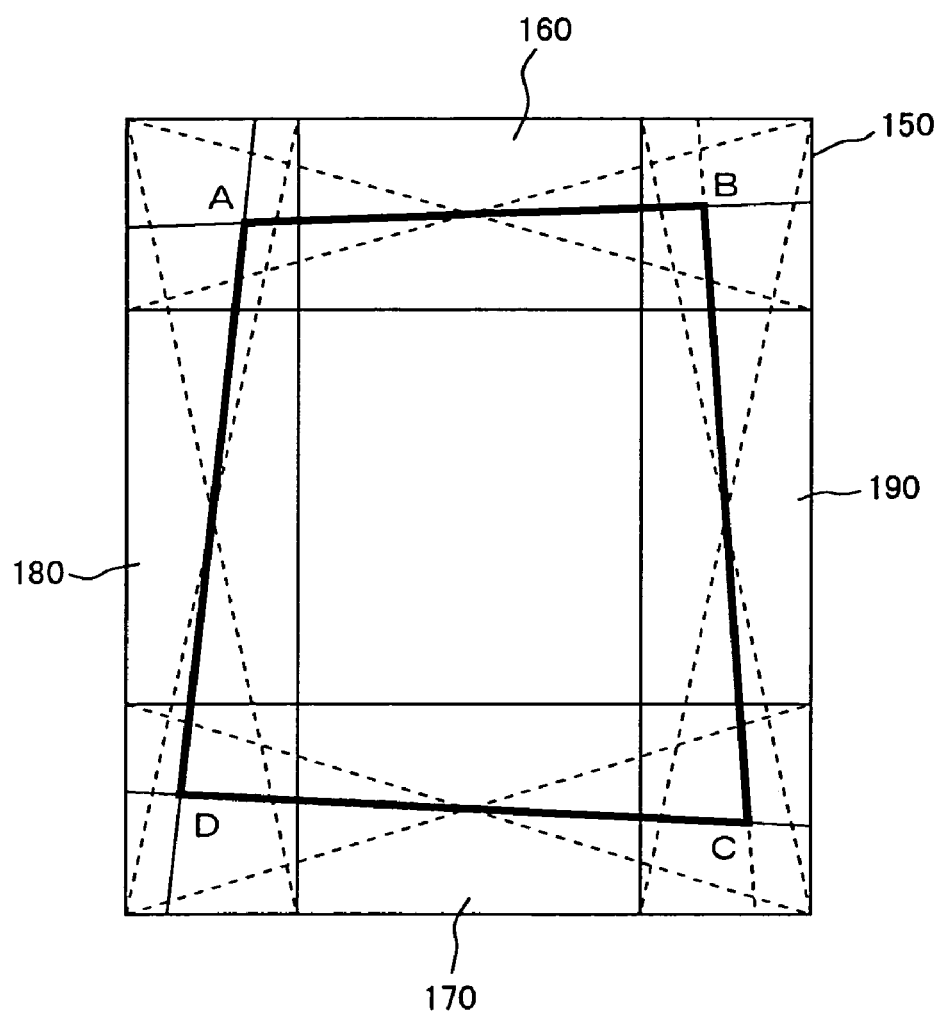

FIG. 24
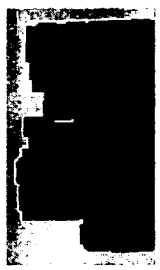
FIG. 25
FIG. 26
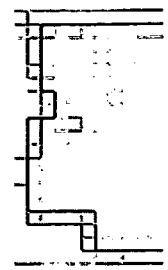
FIG. 27A
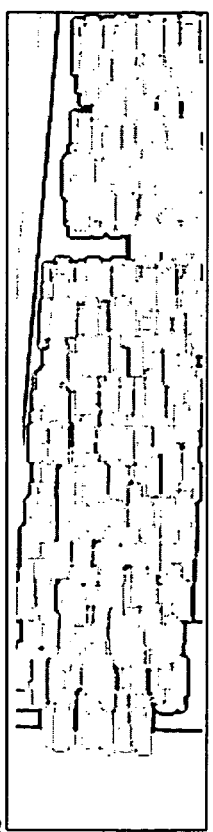
FIG. 28A
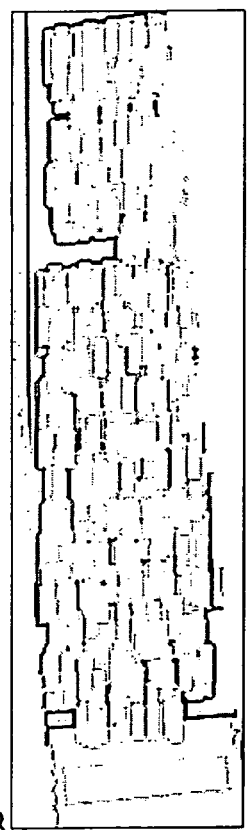
FIG. 27B
HORIZONTAL POSITION
FIG. 28B
HORIZONTAL POSITION
FREQUENCY =
SUM OF ABSOLUTE VALUES
OF TWO-DIMENSIONAL
DIFFERENTIAL VALUES
FREQUENCY =
SUM OF ABSOLUTE VALUES
OF TWO-DIMENSIONAL
DIFFERENTIAL VALUES

傾き方向

IMAGE PROCESSING DEVICE AND IMAGE PROCESSING METHOD FOR CORRECTION OF IMAGE DISTORTION

This application is based on applications Nos. 11-078214 and 11-185967 filed in Japan, the contents of which are hereby incorporated by reference.

BACKGROUND OF THE INVENTION

1. Field of the Invention

The present invention relates to image processing devices and image processing methods. More particularly, the present invention relates to image processing devices and image processing methods allowing correction of image distortion produced by relative misalignment of an original and a camera at the time of image pick-up.

2. Description of the Related Art

Recently, digital cameras have become quite popular. The digital cameras enable the image pick-up and storage in the form of digital data of originals on which photographs or characters are printed. In digital cameras, usually the picked-up images are first subjected to an image processing for removal of noise from the image and then to a compression processing for reducing the data amount. A different image processing and the compression processing are applied for each picked-up image.

An original paper sheet usually includes a character area, a line-drawn area, a photograph area and so on. Here, the character area represents a rectangular area including only a character in black. The line-drawn area represents a rectangular area mainly constituted of a monochrome area and an edge area, such as a bar graph, an image daubed with one color or the like. The photograph area represents a rectangular area mostly consisted of an image depicted by a variation of tones. The photograph area includes pictures, illustrations, textures, for example.

In the image processing, for example, the correction process or processing process are usually performed for the photograph areas. A focus of the processes is on the tone rather than on the resolution. Conversely, for the character areas, the focus of the processes is usually on the resolution rather than on the tone. With regard to the compression processing, use of compression processing defined by JPEG (Joint Photographic Coding Experts Group) or PNG (Portable Network Graphics) utilizing the concentration of frequency is effective for the photograph areas in view of image quality and compression ratio because high frequency components are not important for the photograph areas. On the other hand, the processing such as predictive coding and dictionary type coding utilizing the concentration of tones is effective for the character areas because pixel values of the character areas are mostly black or white. Hence, the selective application of optimal image processing and compression processing for each area is desirable in view of image quality and compression ratio when areas of different types are included in one image.

Therefore, an area determination process for extracting a rectangular area is conventionally performed. A picked-up image is divided into a plurality of blocks and an attribute indicating which area type the block belongs to is found for each block and then the blocks with the same attribute are enclosed by horizontal lines and vertical lines. Next, the area determination process will be described. FIG. 37 is an illustration of an image obtained by image pick-up of an original by a digital camera. An image 240 includes photograph areas 242 and 246 including an image of photographs, a line-drawn area 244 including an image of a graph and a character area 248 including images of characters. FIG. 38 is an illustration of an image after the area determination processing of the image shown in FIG. 37. With reference to FIGS. 37 and 38, photograph areas 242 and 246 in image 240 are extracted as photograph areas 252 and 256 in an image 250, respectively, through the area determination process. In addition, line-drawn area 244 in image 240 is extracted as a line-drawn area 254 in image 250. Similarly, character area 248 in image 240 is extracted as a character area 258 in image 250.

To extract an area depending on each attribute in the area determination processing, a rectangle enclosed by two vertical lines and two horizontal lines are used as a unit of extraction. This is because most of the conventional compression scheme according to JPEG, PNG or the like are performed based on the rectangular unit, and areas included in an original in which photographs and characters are shown are mostly rectangular.

Now, when an image of an original representing information such as characters and photographs is to be picked up by a digital camera, for example, the picked-up image becomes distorted due to a swing of a lens of the digital camera. Even when the actual shape of the original is rectangular, the image picked up by the digital camera will be in a form of a trapezoid.

As a technique for correcting the distortion of an image attributable to a swing at the image pick-up in an image obtained by the digital camera, U.S. Pat. No. 5,528,194 is known, for example. In U.S. Pat. No. 5,528,194, a technique is described for correcting a swing by deforming a trapezoidal object, which is originally a rectangle, in an image, into a rectangle.

In addition, a technique for correcting a distortion of an image projected on to a screen according to an image projecting device projecting an image on a screen is disclosed in Japanese Patent Laying-Open No. 10-200836. The image projecting device described in Japanese Patent Laying-Open No. 10-200836 projects a reference pattern on a screen, measures a distortion of the projected reference pattern, finds a relation between the location of the screen and the projecting device, and corrects the distortion of an image caused by the swing based on this relation.

(1) First Problem

When a digital camera picks up an image of an original, the camera sometimes becomes tilted with respect to the original during the pick-up. The image of the original thus picked up, therefore, is rotationally shifted. When the area determination process described above is performed on such image obtained through the pick-up, areas cannot be extracted appropriately according to the attribute. This problem will be described in detail below.

FIG. 39 shows an image obtained through the image pick-up of an original by a digital camera and the original shown in the image is rotationally shifted. An image 260 shown is an image obtained by rotating image 240 shown in FIG. 37 by a given angle. Image 260 includes photograph areas 262 and 266 including images of photographs, a line-drawn area 264 including a image of a graph and a character area 268 including images of characters. Each of areas 262, 264, 266 and 268 are tilted by the same angle as image 260. FIG. 40 shows an image obtained by performing the area determination processing on the image of FIG. 39. With reference to FIGS. 39 and 40, photograph areas 262 and 266 in image 260 are extracted as photograph areas 272 and 276 in an image 270, respectively. Line-drawn area 264 in image 260 is extracted as a line-drawn area 274 in image 270. Similarly, character area 268 in image 260 is extracted as a character area 278 in image 270. Here, comparing character area 278 in image 270 with character area 268 in image 260, it is found that character area 278 includes parts of photograph areas 262 and 266 in addition to character area 268. Similarly, areas 272, 274 and 276 in image 270 include parts that should be included in other areas.

When an area extracted through the area determination processing includes a part which should be included in a different area, an optimal image processing or compression processing cannot be performed, resulting in the degradation of image quality, compression ratio and so on.

To solve this problem, it is possible to detect an edge of the original in the image obtained through image pick-up of the original, and to determine the inclination of the original based on the inclination of the detected edge of the original. The image obtained through image pick-up of the original by the digital camera, however, does not necessarily include an edge of the original. Even if the edge of the original is included in the obtained image, when the image of the original is picked up together with the image of a desk, for example, on which the original resides, the pattern on the desk may be shown in the background and makes it difficult to distinguish the edge of the original from the pattern of the desk.

FIG. 41 shows an image, which is obtained through the image pick-up of an original by a digital camera and does not include an edge of the original. As an image 280 does not include the edge of the original, the rotational shift of the original in the image cannot be found through the detection of inclination of the edge of the original. FIG. 42 shows an image, which is obtained through the image pick-up of an original by a digital camera and includes an image of a desk as a background of the image of the original. An image 285 is shown as a picked-up image of an original 290 and a desk 292 on which the original resides. Desk 292 has a pattern 296 thereon. Though the determination of an edge 294 of desk 292, pattern 296 of desk 292 thereon and an edge 298 of original 290 as edges is possible through the detection of edges from image 285, it is difficult to detect which corresponds to the edge of original 290.

(2) Second Problem

According to the technique described in U.S. Pat. No. 5,528,194, an entire object (original) must be included in an input image. However, depending on the zoom magnification and the position of pick-up, the entire object may not be included in the picked-up image. Specifically, when the image of the original is picked up by a digital camera, if the zoom magnification is high or the distance between the digital camera and the original is short, it is impossible to place the original as a whole into the scope of the camera allowing the pick up.

FIG. 43 shows an example of an original that is an object of an image pick-up by a digital camera. FIG. 44 shows an example of an image obtainable by the image pick-up of the original shown in FIG. 43 by the digital camera and does not include an edge of the original. FIG. 45 shows an example of an image obtainable by the image pick-up of the original shown in FIG. 43 by the digital camera and includes a portion around an edge of the original. As an overall outline of the original is not included in the image in FIGS. 44 and 45, the identification of the shape of the original is impossible.

Alternatively, a rectangular area included in the original can be chosen as an object to be processed. The rectangular area, however, is not always included in the original and even if the rectangular area is included in the original, it is not always included in the image as described above. Therefore, when the object is not entirely included in the image, an appropriate correction cannot be performed according to U.S. Pat. No. 5,528,194.

Additionally, though in the technique described in Japanese Patent Laying-Open 10-200836, the reference pattern is projected onto the screen, it is not easy to measure the distortion of the reference pattern projected on the original. This is because that the condition of image pick-up is different from time to time and the image pick-up is not always performed under the sufficient light and that it is difficult to distinguish a design pattern on the original from the reference pattern as the design pattern is shown on the original in various forms such as characters, photograph, and so on.

SUMMARY OF THE INVENTION

The present invention is made to solve the above-described problems and one object of the present invention is to provide an image processing device and an image processing method allowing rapid and correct finding of a distortion of an image obtained by an image pick-up of an original by a digital camera or the like.

Another object of the present invention is to provide an image processing device allowing a correction of an image distorted due to an effect of a swing even when an object does not include a rectangular area or the entire object is not included in the image.

Still another object of the present invention is to provide an image processing device allowing a rapid and correct correction of an image distorted due to an effect of a swing.

Still further object of the present invention is to provide an image processing device allowing a correction of an inclination of an image and a distortion of the image caused by a swing in the image obtainable by the image pick-up of an original.

To achieve the above-described objects, according to one aspect of the present invention, the image processing device includes: an image receiving unit to receive an original image data; an edge detection unit to detect an edge data included in an image data related to the received original image data; a rotation unit to rotate the detected edge data; an operation unit to derive a characteristic amount of the rotated edge data; and an inclination angle detection unit to detect an inclination angle of the received original image data based on the derived characteristic amount.

According to the present invention, the image processing device capable of rapidly and correctly finding the inclination of the received original image data can be provided.

According to another aspect of the invention, the image processing device includes: an image receiving unit to receive an original image data; a process image forming unit to form an image data to be processed based on the received original image data; a geometric transformation unit to perform a swing rotation transformation on the formed image data using an angle as a parameter; a first inclination detection unit to detect a first inclination of a first area in the formed image data; a second inclination detection unit to detect a second inclination of a second area opposing the first area in the formed image data; and a swing correction unit to perform a swing rotation transformation on the received original image data based on the first inclination and the second inclination.

According to the present invention, the image processing device can be provided capable of correcting an image data distorted due to the effect of the swing even when the entire object is not included in the image data or the object does not include a rectangular area.

In addition, the image processing device capable of rapidly and correctly correcting the image data distorted due to the effect of the swing can be provided.

According to still another aspect of the present invention, the image processing device includes: an image receiving unit to receive an original image data obtained with a camera picking up an original image; a swing correction unit to correct an image based on distortion caused by a swing of the camera with respect to the original image; and a skew correction unit to correct an image based on distortion caused by a skew of the camera with respect to the original image.

According to the present invention, the image processing device can be provided capable of correcting the inclination of the original image data obtainable by the image pick-up of the original image by the camera and the distortion of the image caused by the effect of the swing.

According to further aspect of the present invention, the image processing method includes the steps of: receiving an original image data; detecting an edge data included in of an image data to be processed related to the received original image data; rotating the detected edge data; deriving a characteristic amount of the rotated edge data; and correcting an inclination of the received original image data based on the derived characteristic amount.

According to the present invention, the image processing method allowing rapidly and correctly finding the inclination of the obtained original image data can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a block diagram showing a circuit structure of a digital camera 1 according to the second embodiment;

FIG. 13 is referenced for describing a swing of a digital camera;

FIG. 15 shows an example of a trapezoid formed by a trapezoid formation process in a step S102 of FIG. 14;

FIG. 24 shows an example of a reduced image of a portion of an area where characters of an input image are shown;

FIG. 25 shows an image formed by performing a smoothing and an MIN filtering process on a reduced image shown in FIG. 24;

FIG. 26 shows an image formed by performing a two-dimensional differentiation process on an image shown in FIG. 25;

FIGS. 27A and 27B are diagrams showing a two-dimensional differential image and a projection histogram in a vertical direction corresponding to left partial image 180;

FIGS. 28A and 28B are diagrams showing a two-dimensional differential image and a projection histogram in a vertical direction corresponding to an image formed by rotating a left partial image 180 by a predetermined angle of rotation;

DESCRIPTION OF THE PREFERRED EMBODIMENTS

Figure 1:
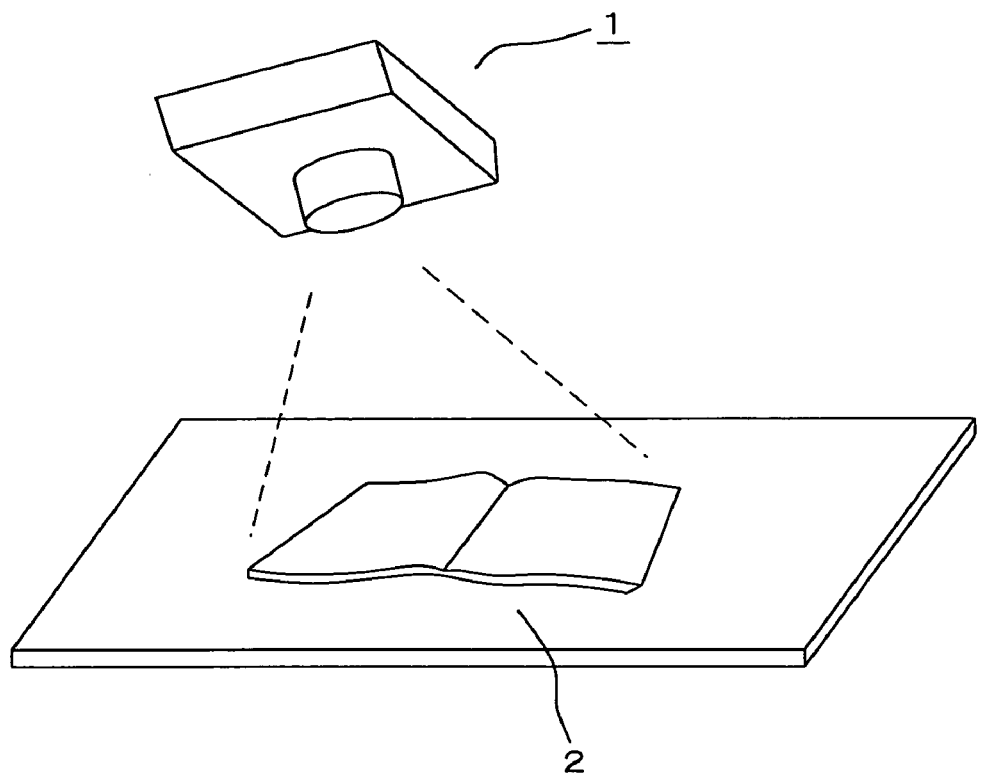
FIG. 1 shows a relation between a digital camera and an original which is an object of image pick-up according to the first embodiment.

The preferred embodiments of the present invention will be described below with reference to the drawings. In the drawings, the same reference character indicates the same or a corresponding portion.

First Embodiment

With reference to FIG. 1, in the first embodiment, relative misalignment of a digital camera 1 and an original 2 is detected from an image obtained from image pick-up of original 2 by digital camera 1.

Figure 2:
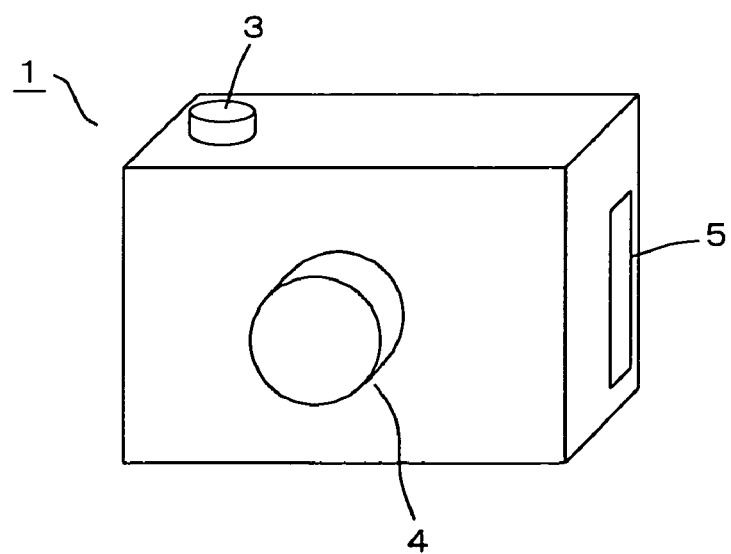
FIG. 2 is a perspective view of a digital camera from a side of a lens.

FIG. 2 is a perspective view of a digital camera 1 from a side of a lens. With reference to FIG. 2, digital camera 1 includes a pick-up button 3, a pick-up lens portion 4 and a card insertion inlet 5.

The result of image pick-up by digital camera 1 is stored as electronic data in a hard disc card (not shown) inside digital camera 1. Here, the hard disc card is a recording medium of image data and hard disc cards compliant with PCMCIA (Personal Computer Memory Card Interface Association) standard, for example, can be employed as such. Alternatively, a memory card can be employed. As a recording medium, mini discs (MDs) can be used as well. Alternatively, digital camera 1 can be directly connected to a printer or the like via an SCSI (Small Computer System Interface) cable or the like without using a card as a recording medium.

Digital camera 1 according to the first embodiment allows improvement in image quality and compression ratio of images stored as an electronic data taken from originals in the form of sheets of paper such as materials distributed at conferences, catalogues, magazines, study records, or the like.

Figure 3:
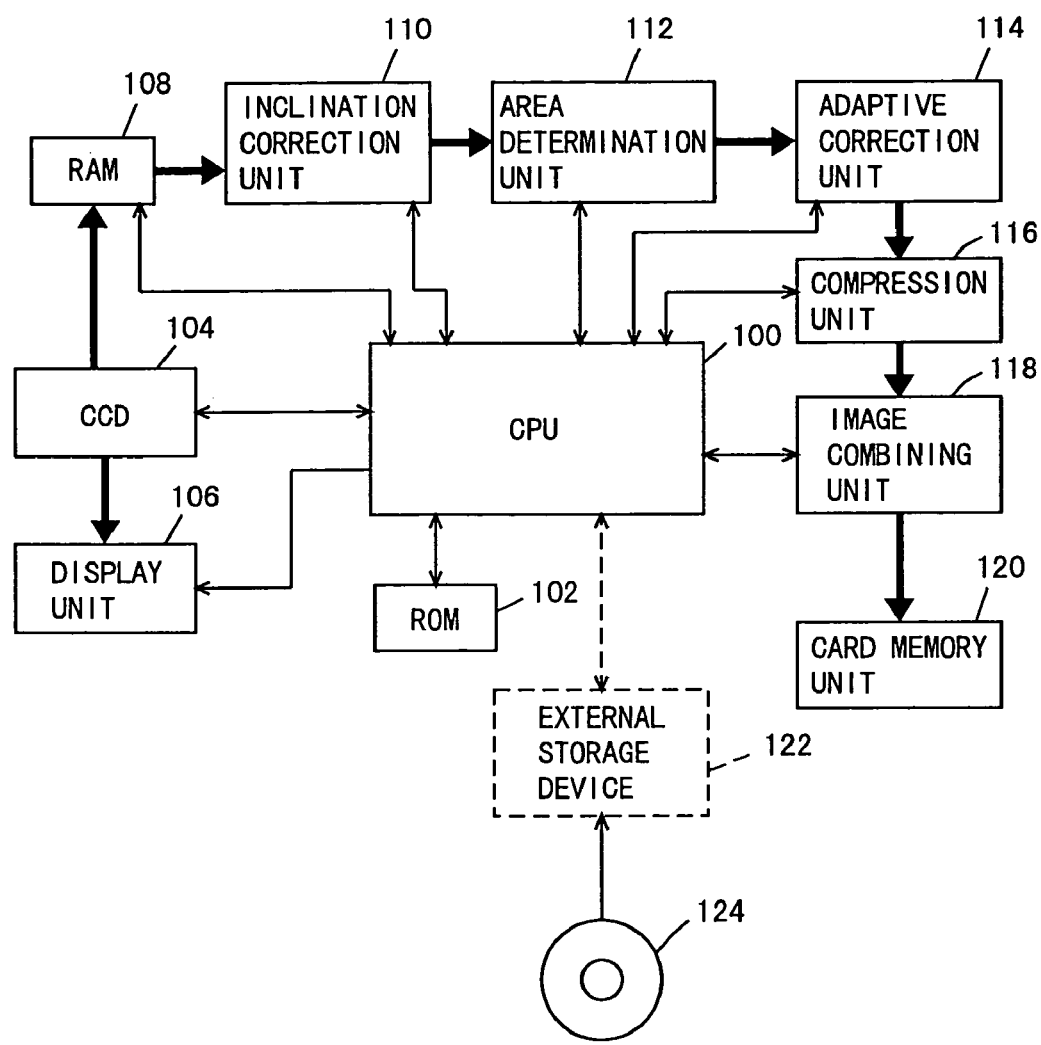
FIG. 3 is a block diagram showing a circuit structure of a digital camera according to the first embodiment.

FIG. 3 is a block diagram showing a circuit structure of a digital camera 1. With reference to FIG. 3, digital camera 1 includes a central processing unit (CPU) 100 performing an overall control of digital camera 1, a charge coupled device (CCD) 104 performing an image pick-up, a display unit 106 displaying a content of the image pick-up, a random access memory (RAM) 108 temporarily storing an image from CCD 104, an inclination correction unit 110 correcting an inclination of the picked-up image, an area determination unit 112 extracting an attribute area from the corrected image, an adaptive correction unit 114 performing an appropriate correction on each of the extracted attribute area, a compression unit 116 performing a compression on each of the corrected attribute area, an image combining unit 118 integrating the compressed image and supplying the result of integration, a card memory unit 120 recording the image and a read only memory (ROM) 102 storing a program to be performed in CPU 100.

Here, an external storage device 122 can be installed for CPU 100 of digital camera 1 such that a program for the control of digital camera 1 can be read from a CD-ROM 124, a floppy disc, or the like.

Next, with reference to the block diagram shown in FIG. 3, a manner of an actual image pick-up will be described. In FIG. 3, an arrow in a bold line represents a flow of image data and an arrow in a thin line represents a flow of control data. When the user turns ON the power of the camera, a scene being captured by pick-up lens portion 4 is displayed on display unit 106 through CCD 104.

On detecting the ON state of pick-up button 3, CPU 100 instructs CCD 104 to perform integration of CCD and at the completion of the integration, and a dumping of CCD data to RAM 108 is performed. Then, display unit 106 is made to display (freeze display) the image. The image from CCD 104 is stored in RAM 108.

When the image from CCD 104 is stored in RAM 108, processes are sequentially performed in each of inclination correction unit 110, area determination unit 112, adaptive correction unit 114, compression unit 116 and image combining unit 118 in this order. Image compression data compliant with JPEG, PNG or the like is stored in a card memory unit 120. Card memory unit 120 can be a hard disc, an external storage device, a terminal or the like. Alternatively, the image data can be supplied as an output to a printer or a monitor without compression. In addition, the inclination correction process, the area determination process, adaptive correction process described below can be performed inside digital camera 1 or in another camera, a terminal of personal computer, or the like, connected to digital camera 1 by transferring the data thereto.

Figure 4:
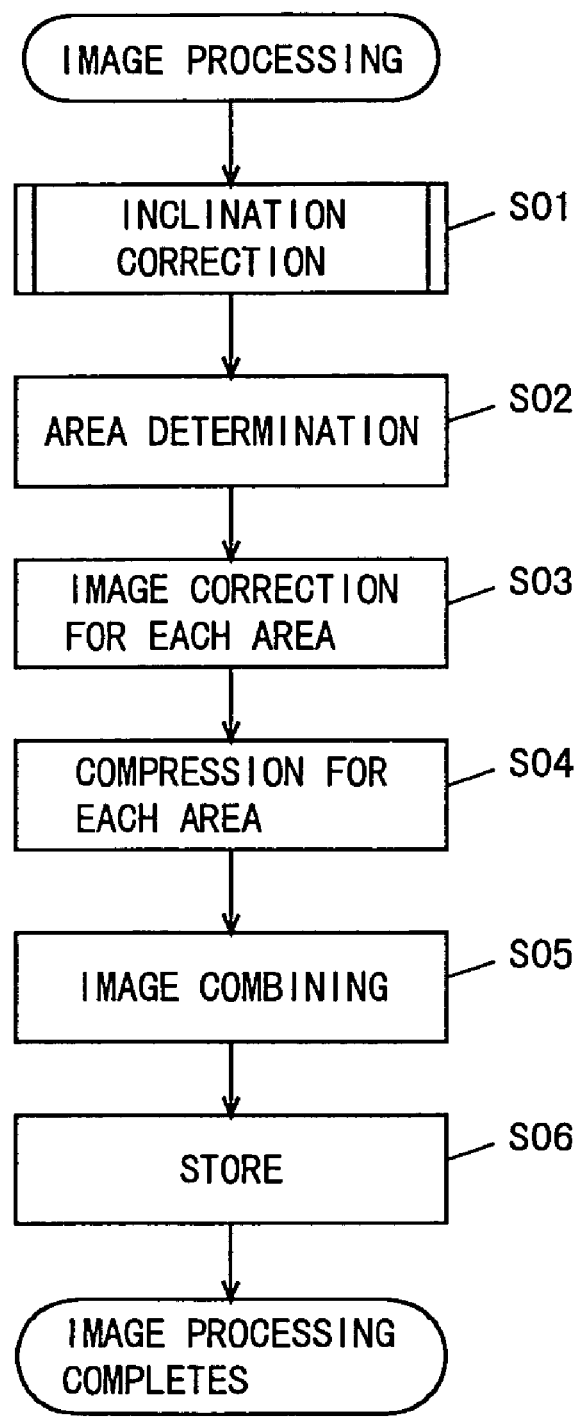
FIG. 4 is a flow chart showing a flow of an image process performed in a digital camera according to the first embodiment.

Next, the flow of the process performed in digital camera 1 after the image is stored in RAM 108 will be described. FIG. 4 is a flow chart showing a slow of an image process performed in digital camera 1. With reference to FIG. 4, when the image picked-up by CCD 104 is stored in RAM 108, the inclination correction process is performed (S01). The inclination correction process will be described later in detail. Next, the area determination process is performed on the image after the inclination correction process (S02). According thereto, the image is divided into the character area with the character attribute, the line-drawn area with the line-drawn attribute and the photograph area with the photograph attribute. Then, the image correction process is performed for each of the divided areas (S03). On the character area, processes such as resolution transformation, character correction, and binarization are performed. On the line-drawn area and the photograph area, smoothing is performed to prevent the degradation in image quality and decrease in compression ratio due to noise.

Then, on each area on which the image correction process has been performed, a corresponding compression process is performed (S04). Binary compression is performed on the character area, Lossless compression is performed on the photograph area, and Lossy compression is performed on the photograph area. With respect to the character area, if OCR (Optical Character Recognition) has been performed in the area-specific image correction process in Step S03, a process of transformation into a character code may be performed in the area-specific compression process in Step S04.

Data compressed for each area is integrated (S05) and supplied as an output to card memory unit 120 (S06).

Here, it is possible to perform only one of the area-specific image process of step S03 and the area-specific compression process of step S04.

Figure 5:
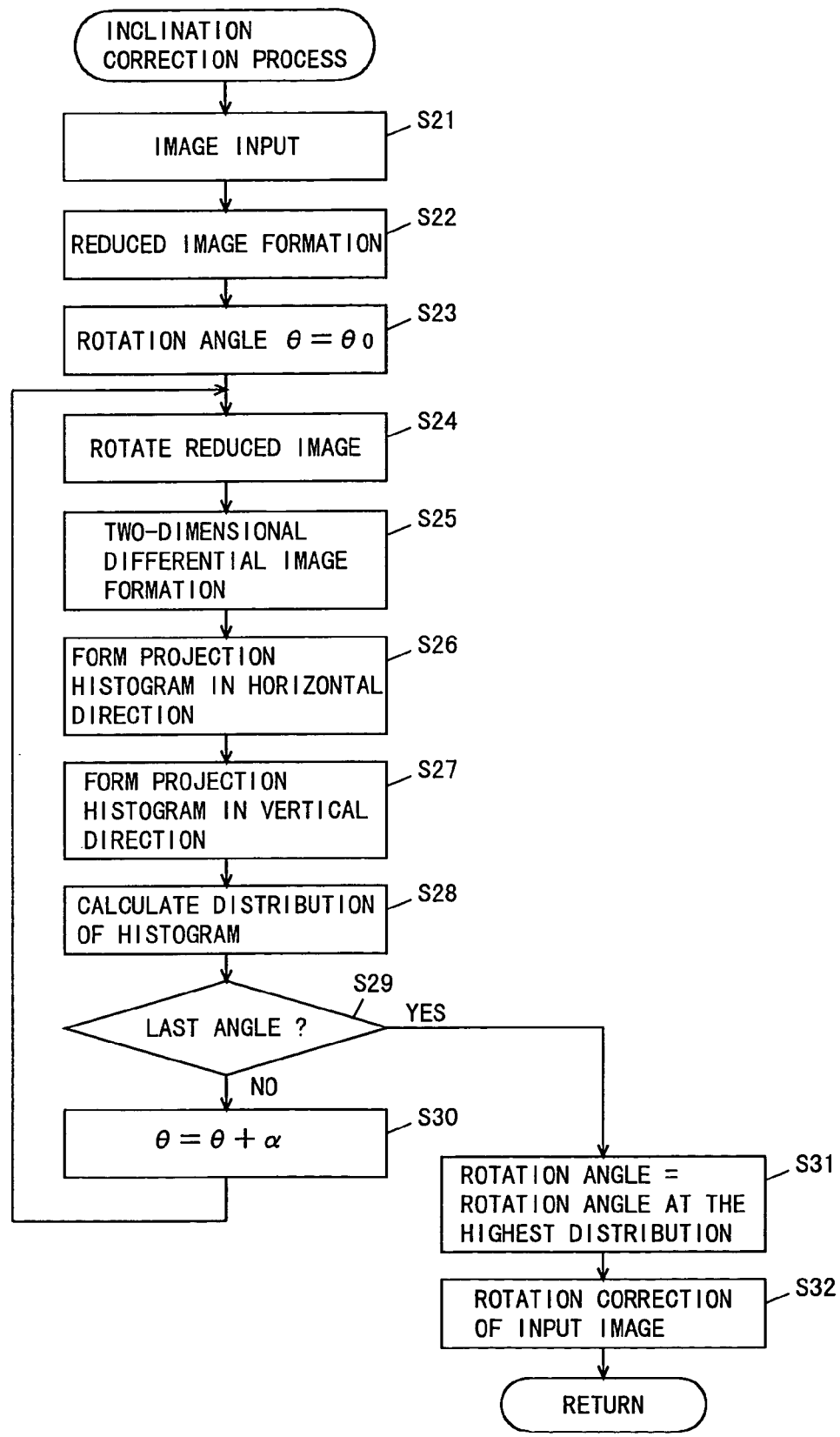
FIG. 5 is a flow chart showing a flow of an inclination correction process performed in step S01 shown in FIG. 4.

Next, the inclination correction process will be described. FIG. 5 is a flow chart showing a flow of an inclination correction process performed in step S01 shown in FIG. 4. The inclination correction process is performed in the inclination correction unit 110. When the image is input from RAM 108 (S21), a reduced image is formed (S22). The reduced image can be obtained, for example, by simply averaging the pixel values of 8×8 pixels and employing the obtained value as a pixel value after the reduction. Alternatively, a central value of the surrounding pixels can be employed instead of the simple average to obtain the reduced image.

Thus, by reducing the image, the character area can be integrated and made rectangular with a space between the characters in the character area filled. When a space between the lines is wide in the character area, character of each line is smudged and seen as a line-shape image. A contour of an image of a building shown in a photograph area or a contour of a table shown in a line-drawn area is important in an image as an edge in a vertical or a horizontal direction. These edges can be retained even if the image reduction is performed.

In addition, as the number of pixels to be processed decreases with the reduction of the image, subsequent processes can be rapidly performed.

Figure 6A:
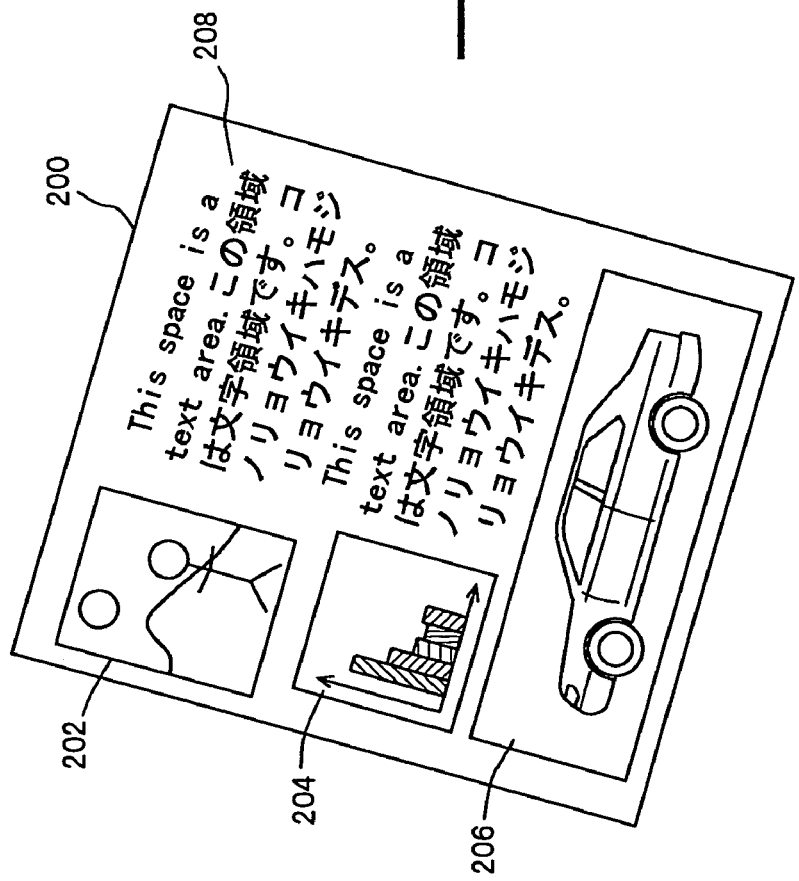
FIGS. 6A and 6B show an input image and a reduced image.
Figure 6B:
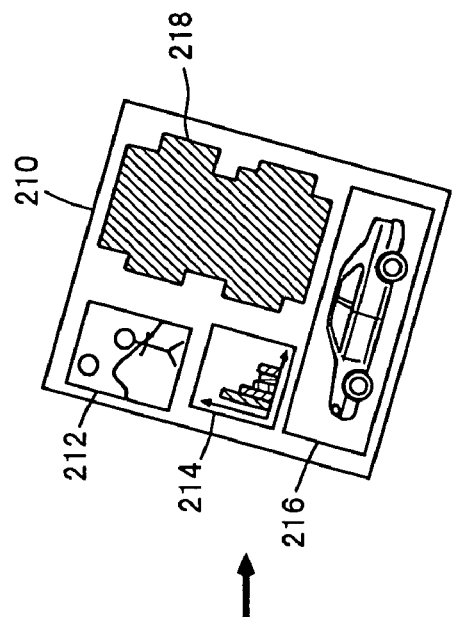

FIGS. 6A and 6B show an image stored in RAM 108 and a reduced image thereof. FIG. 6A shows the image stored in RAM 108 whereas FIG. 6B shows the reduced image obtained by reducing the image of FIG. 6A. An image 200 shown in FIG. 6A includes photograph areas 202 and 206, a line-drawn area 204 and a character area 208. A reduced image 210 obtained by reducing image 200 includes areas 212 and 216 obtained by reducing photograph areas 202 and 206 in image 200, an area 214 obtained by reducing line-drawn area 204 in image 200 and an area 218 obtained by reducing character area 208 of image 200. Areas 212 and 216 in reduced image 210 corresponding to photograph areas 202 and 206 in image 200 retain vertical and horizontal edges included in the photograph after the reduction. Similarly, area 214 in reduced image 210 corresponding to the line-drawn area in image 200 retains vertical and horizontal edges included in a graph in area 204.

On the other hand, area 218 in reduced image 210 corresponding to area 208 where characters are shown in image 200 becomes an integrated area with a space between the characters filled. In the character area where the space between the lines is wide, character of each line is smudged and seen as a line-shape image.

Returning to FIG. 5, a rotation angle θ is set to an initial value $\theta_0$ in order to rotate the reduced image by initial value $\theta_0$ at step S23. Then the reduced image is rotated by rotation angle θ (S24). In the rotation of the reduced image, an image after the rotation can be obtained through the coordinate transformation. If no pixel value corresponding to a pixel of the image after the rotation is given, Cubic Convolution can be used to interpolate with the surrounding pixel value to obtain the desired pixel value. A process from step S25 to step S28 is performed on the image obtained by rotating the reduced image at a plurality of rotation angles in step S24. Here, the maximum value and the minimum value and an step width of an angle for rotating the reduced image in step S24 can be changed according to a process speed and a memory in inclination correction unit 110.

Figures 7, 8:
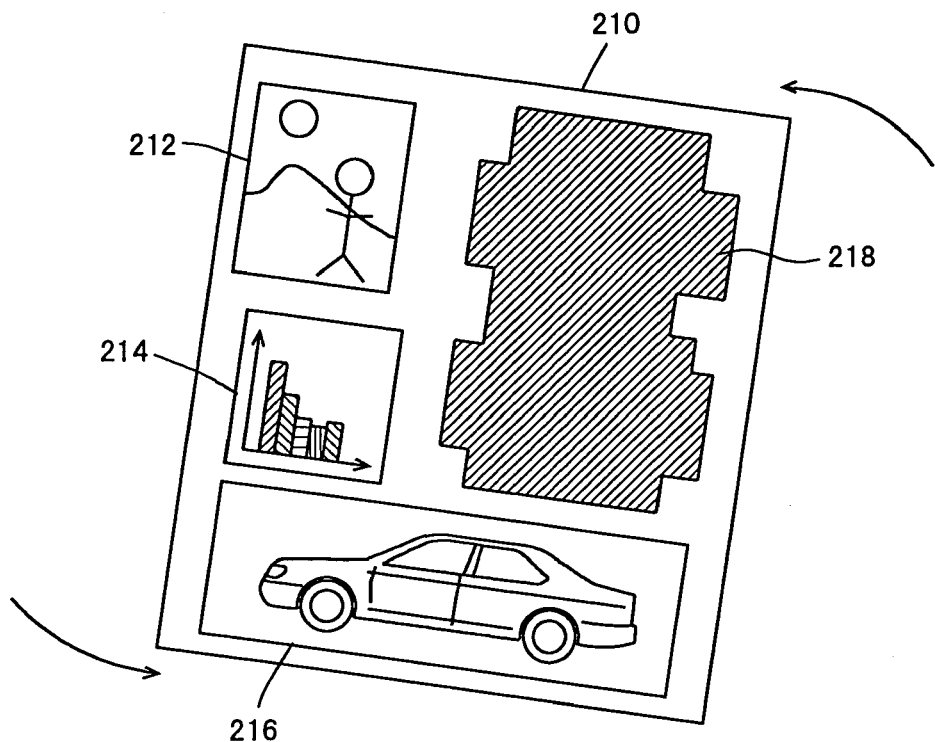
FIG. 7 is referenced for describing a state of rotation of a reduced image.
FIG. 8 is a diagram showing an example of a two-dimensional differentiation filter.

FIG. 7 shows the condition of the reduced image after rotated by rotation angle θ. The reduced image obtained by rotating the reduced image about a center of gravity of the reduced image by rotation angle θ is not different from the reduced image before the rotation in its content.

Returning to FIG. 5, two-dimensional differentiation is performed on the rotated reduced image to form a two-dimensional differential image (S25). A two-dimensional differential can be obtained by a convolution operation on the rotated reduced image with a filter. FIG. 8 shows an example of a filter employed for the two-dimensional differentiation. A pixel value of a target pixel is multiplied by a factor of four. Then, each of pixel values of adjacent pixels located above, below, right and left of the target pixel are subtracted from the resulting value. The absolute value of the resulting value is regarded as the two-dimensional differential value of the target pixel. The two-dimensional differential value can be a negative value. In this embodiment, however, the two-dimensional differential value is assumed to be the absolute value. The term "two-dimensional differential value" below means the absolute value of the two-dimensional differential value, if not otherwise indicated.

Figure 9:
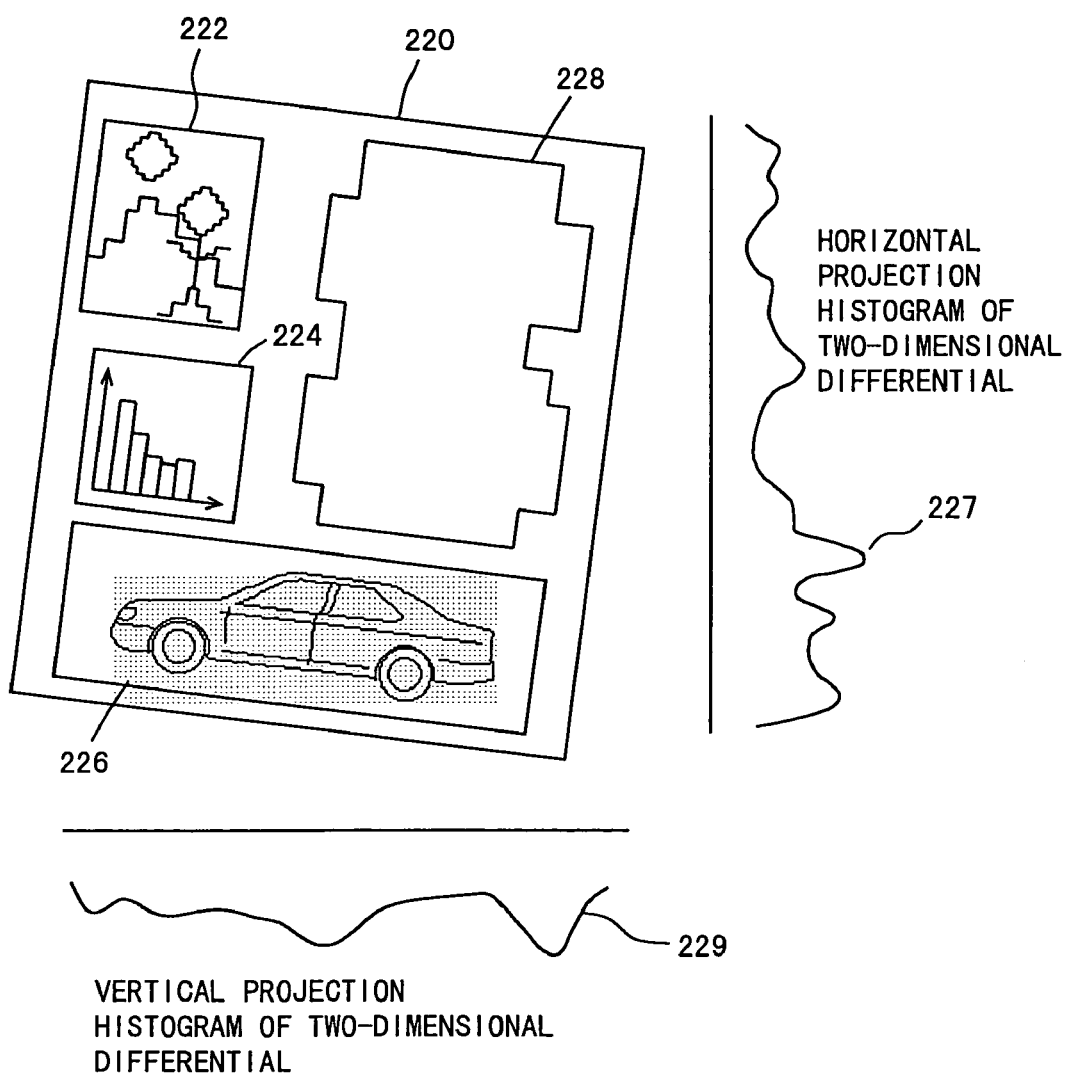
FIG. 9 is a diagram showing a two-dimensional differential image and a horizontal projection histogram and a vertical projection histogram of a two-dimensional differential.

The two-dimensional differential image obtained by performing two-dimensional differentiation on the reduced image is an image with an edge extracted from the reduced image. FIG. 9 is diagram showing a two-dimensional differential image and a horizontal projection histogram and a vertical projection histogram of a two-dimensional differential. With reference to FIGS. 7 and 9, photograph areas 222 and 226 and a line-drawn area 228 in two-dimensional differential image 220 represent contours of photograph areas 212 and 216 and line-drawn area 214 of reduced image 210, respectively. Character area 218 in reduced image 210 is integrated and spaces between characters are filled in step S24 and becomes a daubed image with little variation in density. Hence, in an area 228 of two-dimensional differential image 220 corresponding to character area 218, only a contour of area 228 is shown. In the character area in which the space between the lines is wide, as characters of line are smudged, line-shape image is shown. The two-dimensional differential image thereof is also a line-shape image corresponding to each line. The inclination of the line-shape image is the same with the inclination of line. Thus, with the use of the reduced image, the character area can be analyzed in a macro manner.

Returning to FIG. 5, at next step S26, two-dimensional differential values of the obtained two-dimensional differential image are added in a horizontal direction to form a projection histogram (S26). Similarly, two-dimensional differential values are added in a vertical direction, too, to form a projection histogram (S27).

Generally, a boundary of an area such as the character area and the photograph area in an original which is not inclined is arranged in vertical or horizontal direction. In addition, the photographs and the graphs often include many vertical lines and horizontal lines. Hence, when the original is not inclined, pixels with high absolute values of the two-dimensional differential values tend to concentrate on the same row or column. With reference to FIG. 9, a horizontal projection histogram 227 found by adding two-dimensional differential values of pixels arranged in the horizontal direction of two-dimensional differential image 220 and a vertical projection histogram 229 obtained by adding two-dimensional differential values of pixels arranged in the vertical direction are shown. When the original is inclined, the pixels with high absolute values of two-dimensional differential values are unlikely to fall on the same row or column. Hence, both horizontal projection histogram and vertical projection histogram are shown as a generally smooth histogram as a whole with gentle ups and downs.

Returning to FIG. 5, in step S28, a distribution of the projection histogram is calculated for each of the found projection histograms in the horizontal direction and in the vertical direction (S28). The distribution of the projection histogram is the distribution of added two-dimensional differential values. Therefore, the larger distribution means larger variation in the sum of two-dimensional differential values.

Next, it is determined whether rotation angle θ is the last angle or not (S29). In this process, a plurality of values are previously prepared as the values to be set as rotation angle θ, and it is determined whether the process from step S24 to step S28 have been performed for all of the values. If it is determined that the angle is not the last angle in step S29, an angle step width α is added to rotation angle θ (S30) and the process goes back to step S24. Then the process from step S24 to step S28 is repeated.

If the rotation angle θ is the last angle, that is, when the process from step S24 to step S28 has been performed for all rotation angles, the process proceeds to step S31.

At step S31, a rotation angle θ at which the distribution of the projection histogram found in step S28 is the highest is found. In step S28, the distribution in each of horizontal and vertical projection histograms is calculated. At step S31, the rotation angle θ at which the sum of the distributions of each of vertical and horizontal projection histograms is the largest is found. Here, if there is a limit in the original to be processed or the direction of process, only one of the projection histogram in the horizontal direction and the projection histogram in the vertical direction may be considered.

Next, the rotation correction of the input image is performed with the rotation angle θ at which the distribution is the highest (S32).

Here, if the input image is in color, the above described process may be performed for image in each of R, G and B, and an average value of rotation angles at which distribution is the highest for each of images of R, G and B may be used as a rotation angle employed for the rotation correction of the input image. Alternatively, using the average value of R, G and B or the sum of the pixel values of R, G and B, as the pixel value, the above-described process may be performed and the rotation angle for the rotation correction of the input image may be found. Alternatively, only one of images of R, G and B may be utilized.

Figure 10:
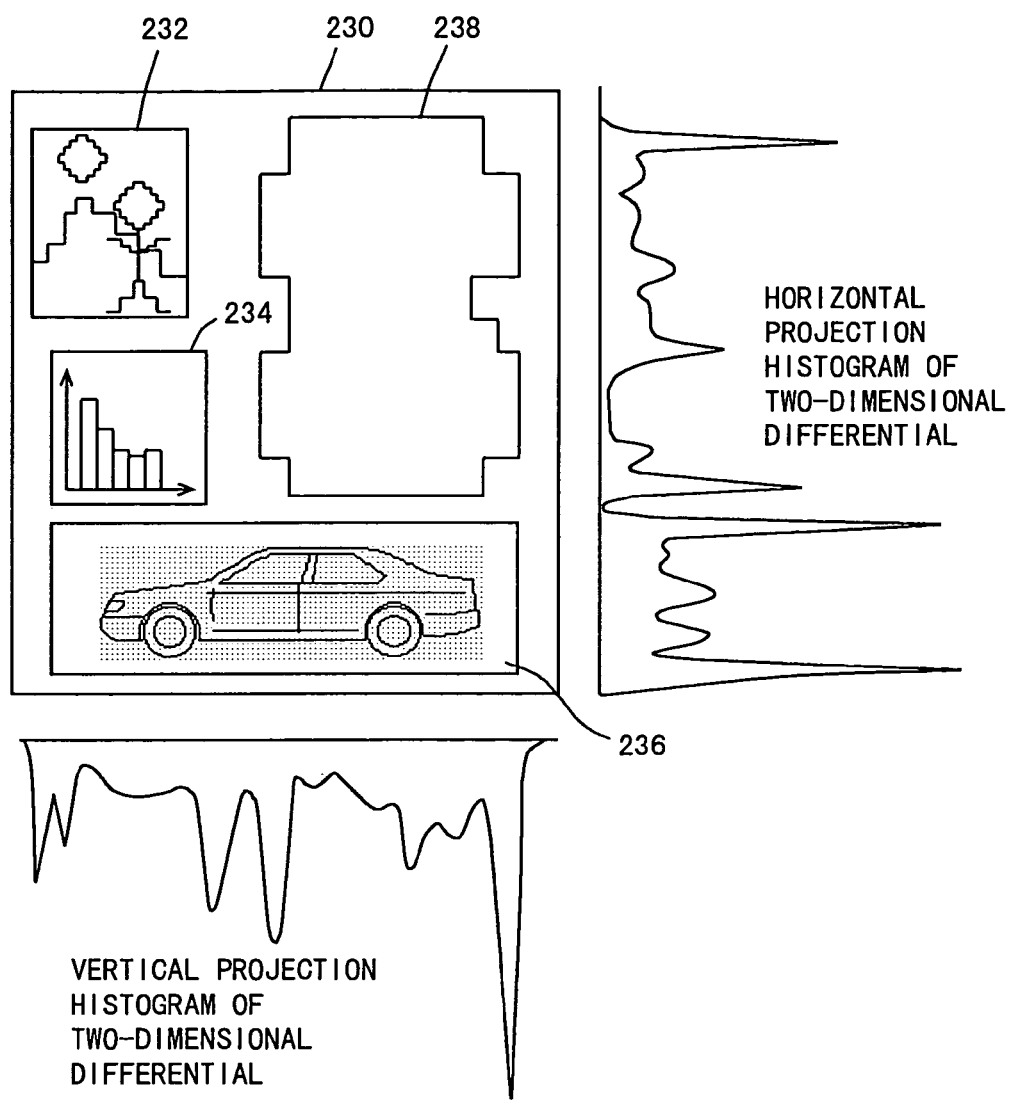
FIG. 10 is a diagram showing a reduced image and a projection histogram where a sum of distribution of the projection histogram is a maximum as the result of rotation of the reduced image.

FIG. 10 shows a reduced image and projection histograms in the horizontal and vertical directions when the reduced image is rotated by the rotation angle at which the distribution is the highest. As is evident from FIG. 10, when an edge portion represented in reduced image 230 is aligned in the horizontal direction, the value of two-dimensional differential horizontal projection histogram is high. Whereas, when the edge is not aligned in the horizontal direction, the value of two-dimensional differential horizontal projection histogram is low. Similarly, in a portion where the edge is arranged in the vertical direction, the value of two-dimensional differential vertical projection histogram is high, whereas in a portion where the edge is not arranged in the vertical direction, the value of two-dimensional differential vertical projection histogram is low. Both of two-dimensional differential horizontal projection histogram and two-dimensional differential vertical projection histogram take high values at a plurality of positions. Conversely, they take low values in other portions. When the shape of two-dimensional differential projection histogram in the horizontal direction or in the vertical direction is as shown in FIG. 10, the distribution of the histogram is high.

Therefore, when the distribution is high, it can be determined that the pixels with high absolute values of two-dimensional differential values are concentrated in the same row or column. Then an angle where the distribution is high can be detected as an angle of inclination of the original.

Here, it is not practical to rotate the input image at a plurality of rotation angles without reduction of the input image in view of process speed and memory capacity of inclination correction unit 110. In this embodiment, the inclination correction process is performed on the reduced image obtained by reducing the input image, therefore the data amount to be processed decreases. As a result, the problem of process speed and scarcity of memory capacity can be solved. In addition, when the inclination correction process is performed without the reduction of input image, as the edge of the character itself is selected as a pixel with high absolute value of a two-dimensional differential value in an area including a character, the process is affected by the font of the character and the language. When the reduced image obtained by reducing the original image is employed at the inclination correction process, the space between the characters decreases and the character area becomes a cluster of high density pixels, or takes a line-shape image corresponding to each line. Then, a pixel with a high absolute value of the two-dimensional differential value becomes a boundary of the character area. Hence, the inclination correction becomes more immune to the font of the character and the language.

Here, brightness MIN (minimum) filtering, smoothing, morphology operation and so on can be listed as a process to obtain the same effect as in the reduction process reducing the input image. These processes can be employed independently or in combination with the reduction process. When the smoothing, brightness MIN filtering or morphology operation is to be used, use of different filters in horizontal and vertical directions is effective. For example, when smoothing is performed in the horizontal direction, smoothing is not performed in the vertical direction and the integration of an area is performed in the horizontal direction. Then, the edge in the vertical direction becomes easily detected.

In addition, in the reduction process, reduction may be performed only in the horizontal direction and not in the vertical direction when the horizontal projection histogram is to be formed. Conversely, when the vertical projection histogram is to be formed, the reduction may be performed only in the vertical direction and not in the horizontal direction. Then, the edge in horizontal or vertical direction becomes even more easily detected.

Modification of Inclination Correction Process

Next, a modification of the inclination correction process described with reference to FIG. 5 will be described. In the inclination correction process described above, the projection histograms in the horizontal direction and the vertical direction are formed from the two-dimensional differential image. Then the distribution of each projection histogram is found, and the rotation angle at which the sum of the distribution values is highest is found. In the modification of inclination correction process, the process is the same with the inclination correction process described above up to the formation of two-dimensional differential image. Then, the two-dimensional differential image is binarized and an edge in the two-dimensional differential image is found. Then, a rotation angle at which a sum of distribution of a run length in the vertical direction or the horizontal direction of a pixel included in the found edge is highest is used as a rotation angle for performing the rotation correction of the input image.

Here, the run length in the vertical direction is the number of pixels constituting the edge and consecutively lining in the vertical direction. The run length in the horizontal direction is the number of pixels constituting the edge and consecutively lining in the horizontal direction.

Figure 11:
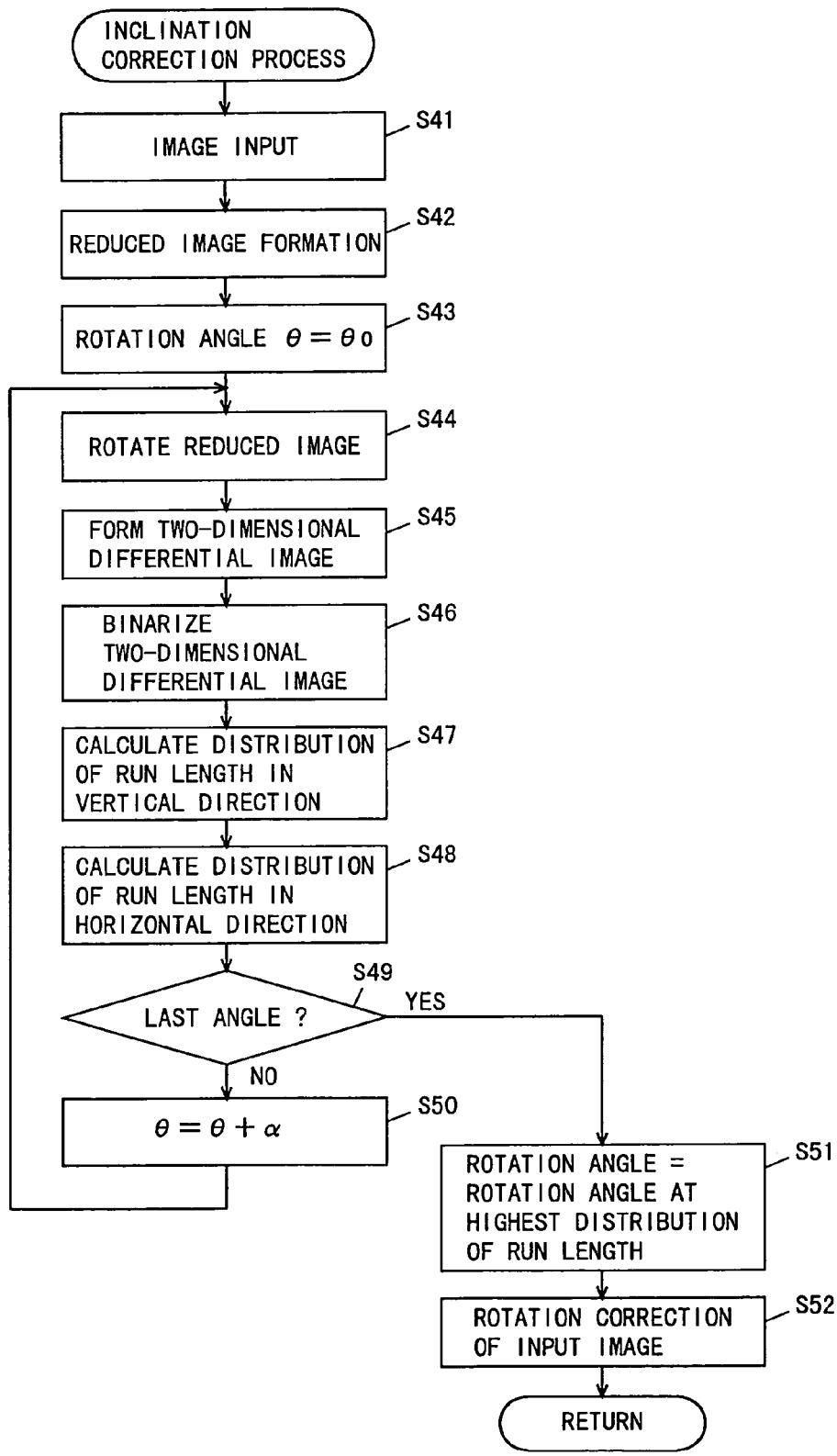
FIG. 11 is a flow chart showing a modification of an inclination correction process performed in step S01 of FIG. 4.

FIG. 11 is a flow chart showing a modification of an inclination correction process performed in step S01 of FIG. 4. With reference to FIG. 11, processes from step S41 to step S45 correspond to the processes from step S21 to step S25 shown in FIG. 5, respectively, and the description thereof will not be repeated. Binarization is performed on the two-dimensional differential image formed at step S45 (S46). Here, binarization is performed on the absolute value of the two-dimensional differential value of the two-dimensional differential image with the use of a predetermined threshold value. If the absolute value of the two-dimensional differential value of each two-dimensional differential image is higher than the predetermined threshold value, it will be represented as "1", and if the value is lower, it will be represented as "0".

Next, the distribution of the run length in the vertical direction will be calculated (S47) and the distribution of the run length in the horizontal direction will be calculated (S48).

The distribution of the run length in the vertical direction takes a high value when the pixels constituting the edge line in the vertical direction and the distribution of the run length in the horizontal direction takes a high value when the pixels constituting the edge line in the horizontal direction. This means that when the distribution of the run length in the vertical direction or the horizontal direction is high, the angle of inclination of the original in the image is small.

After the process from step S44 to step S48 has been performed for all rotation angles, a rotation angle at which the distribution of the run length is maximum is found at step S51. In other words, the rotation angle θ at which the sum of the distribution of the run length in the vertical direction and the distribution of the run length in the horizontal direction is the highest is found. If there is a limit in the original to be processed or the direction of process, only one of the distribution of the run length in the horizontal direction or the distribution of the run length in the vertical direction may be employed.

Then, the rotation correction is performed on the input image based on the found rotation angle θ (S52).

Thus, the rotational distortion of the input image can be detected as in the case where the distribution of histogram obtained from the projection histogram in the horizontal direction and the projection histogram in the vertical direction are employed.

Alternatively, the program for performing the process shown in FIGS. 4 and 5 or FIG. 11 may be recorded in recording medium 124, and the recorded program may be read by external storage device 122 and executed by CPU 100. Recording medium 124 is an optical magnetic recording disc, a digital video disc (DVD) or the like.

Second Embodiment

Next, a digital camera with an image processing device according to the second embodiment will be described. FIG. 12 is a block diagram showing a circuit structure of digital camera 1 according to the second embodiment. With reference to FIG. 12, digital camera 1 includes CPU 100 performing an overall control of digital camera 1, CCD 104 performing an image pick-up, display unit 106 displaying a content of the image pick-up, RAM 108 temporarily storing the image from CCD 104, a trapezoid forming unit 130 forming a trapezoid based on the picked-up image, a horizontal swing angle calculation unit 132 finding a swing angle in a horizontal direction based on the formed trapezoid, a skew rotation angle calculation unit 134 finding a skew rotation angle in a direction of rotation based on the found trapezoid, a vertical swing angle calculation unit 136 finding a swing angle in a vertical direction based on the found trapezoid, a geometric transformation unit 138 performing a geometric transformation on an image stored in RAM 108 based on the found horizontal swing angle, skew rotation angle, and vertical swing angle, card memory unit 120 recording the image and ROM 102 storing a program to be performed in CPU 100.

Here, external storage device 122 can be installed for CPU 100 of digital camera 1 such that the program for the control of digital camera 1 is read out from CD-ROM 124, a floppy disc or the like.

Next, with reference to the block diagram shown in FIG. 12, a manner of an actual image pick-up will be described. In FIG. 12, an arrow in a bold line represents a flow of data, whereas an arrow in a thin line represents a flow of a control signal. When the user turns ON the power of the camera, a scene being captured by pick-up lens portion 4 is displayed on display unit 106 through CCD 104.

On detecting the ON state of pick-up button 3, CPU 100 instructs CCD 104 to perform integration of CCD and at the completion of the integration, performs a dumping of CCD data to RAM 108. Then, display unit 106 is made to display (freeze display) the image. The image from CCD 104 is stored in RAM 108.

When the image from CCD 104 is stored in RAM 108, processes are sequentially performed in each of trapezoid forming unit 130, horizontal swing angle calculation unit 132, skew rotation angle calculation unit 134, vertical swing angle calculation unit 136 and geometric transformation unit 138 in this order and an image from which a distortion caused by the effect of the swing is eliminated is stored in card memory unit 120.

Now, the swing of digital camera 1 will be described. FIG. 13 is referenced for describing the swing of digital camera 1. With reference to FIG. 13, a light axis 151 of lens portion 4 running through a position O $(x_o, y_o, z_o)$ which is a projective center of CCD 104 runs across an image coordinate system 140 at the right angle at a view point o $(u_o, v_o)$. Here, x-y-z represents a three dimensional space. Here, it is assumed that the widthwise direction (horizontal direction)

of the original is placed parallel with the x-axis and the lengthwise direction (vertical direction) of the original is placed parallel with the y-axis. The original is parallel with the x-y plane. One point P (x, y, z) of the original corresponds to p (u, v) in image coordinate system 140.

When light axis 151 of pick-up lens portion 4 is parallel with the z-axis, the original is parallel with image coordinate system 140 and no swing will be generated. The swing of digital camera 1 is generated when the original is not perpendicular to light axis 151. The swing is represented by an angle γ representing an angle of rotation of digital camera 1 about the x-axis and an angle α representing an angle of rotation of digital camera 1 about the y-axis. Hereinbelow, angle γ of rotation about the x-axis will be referred to as vertical swing angle γ and angle α of rotation about the y-axis will be referred to as horizontal swing angle α.

When digital camera 1 is rotated about light axis 151, the x-axis and the u-axis are not parallel to each other, neither the y-axis and the v-axis. Hence, an image represented on image coordinate system 140 is an image inclined toward the u-axis by an angle of rotation of digital camera 1 about light axis 151. An angle β of rotation of digital camera 1 about light axis 151 will be referred to as skew rotation angle β below.

Figure 14:
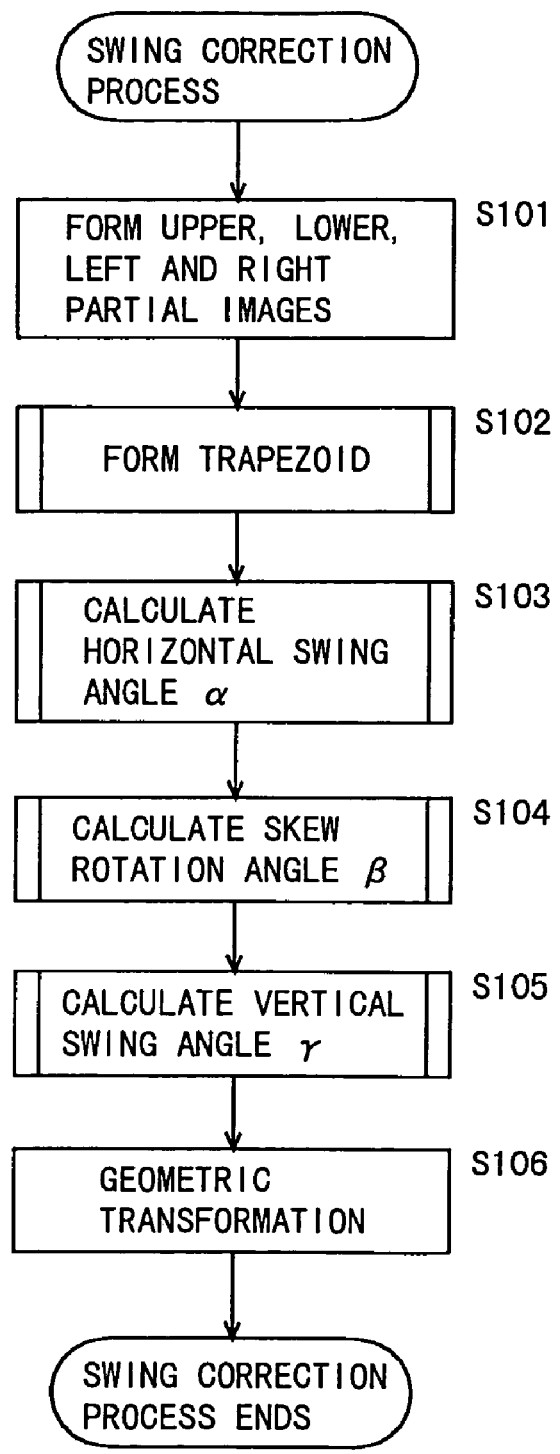
FIG. 14 is a flow chart showing a flow of a swing correction process performed in a digital camera according to the second embodiment.

Next, a process flow in digital camera 1 when the image is stored in RAM 108 will be described. FIG. 14 is a flow chart showing a flow of a swing correction process performed in digital camera 1. With reference to FIG. 14, when an image picked-up at CCD 104 is stored in RAM 108, four partial images are formed from upper, lower, left and right parts of stored image (S101). Assume that the image is divided into four identical portions by horizontal lines. The upper partial image is the uppermost part and the lower partial image is the lowermost part. Assume that the image is divided into four identical portions by vertical lines. The left partial image is the leftmost part and the right partial image is the rightmost part. Here, the partial images are derived by dividing the image into four identical parts by straight lines running in the horizontal (widthwise) direction of the image or in the vertical (lengthwise) direction of the image. The partial images can be obtained in other ways such as by dividing the image into three or six identical parts as far as the partial image is large enough to allow the detection of swing.

Next, based on upper, lower, left and right partial images, trapezoid is formed (S102). FIG. 15 shows an example of a trapezoid formed by the trapezoid formation process in step S102 of FIG. 14. With reference to FIG. 15, an image 150 includes an upper partial image 160, a lower partial image 170, a left partial image 180 and light partial image 190.

Figure 16:
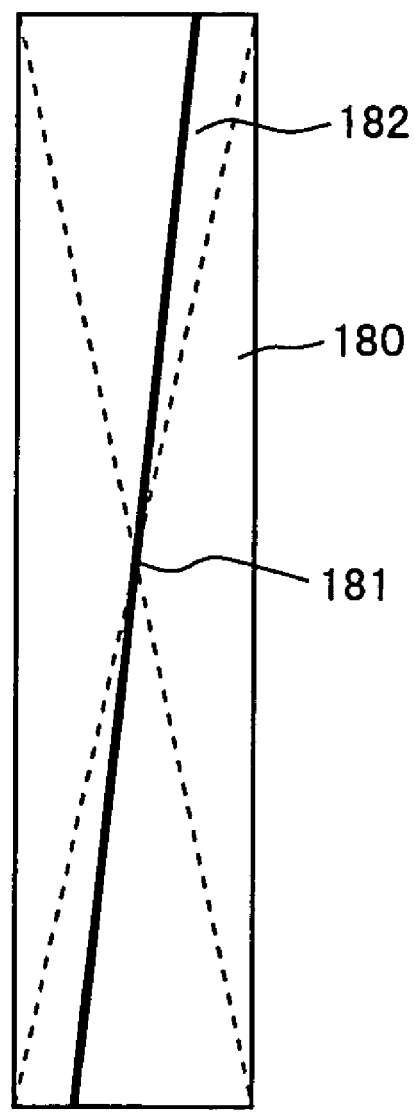
FIG. 16 shows a left partial image and a straight line found from the inclination thereof.

In the trapezoid forming process, an inclination of an object included in each partial image is detected for each partial image and a straight line inclined by the detected amount and running through the center of the partial image is found. FIG. 16 shows left partial image 180 and a straight line found from the inclination thereof. With reference to FIG. 16, a straight line 182 inclined by the angle of inclination of the object image shown in left partial image 180 and running through a center 181 of left partial image 180 is set. With straight lines found for upper, lower, left and right partial images 160, 170, 180 and 190, a trapezoid ABCD shown in FIG. 15 is found. The trapezoid forming process will be described in detail later.

Figure 17:
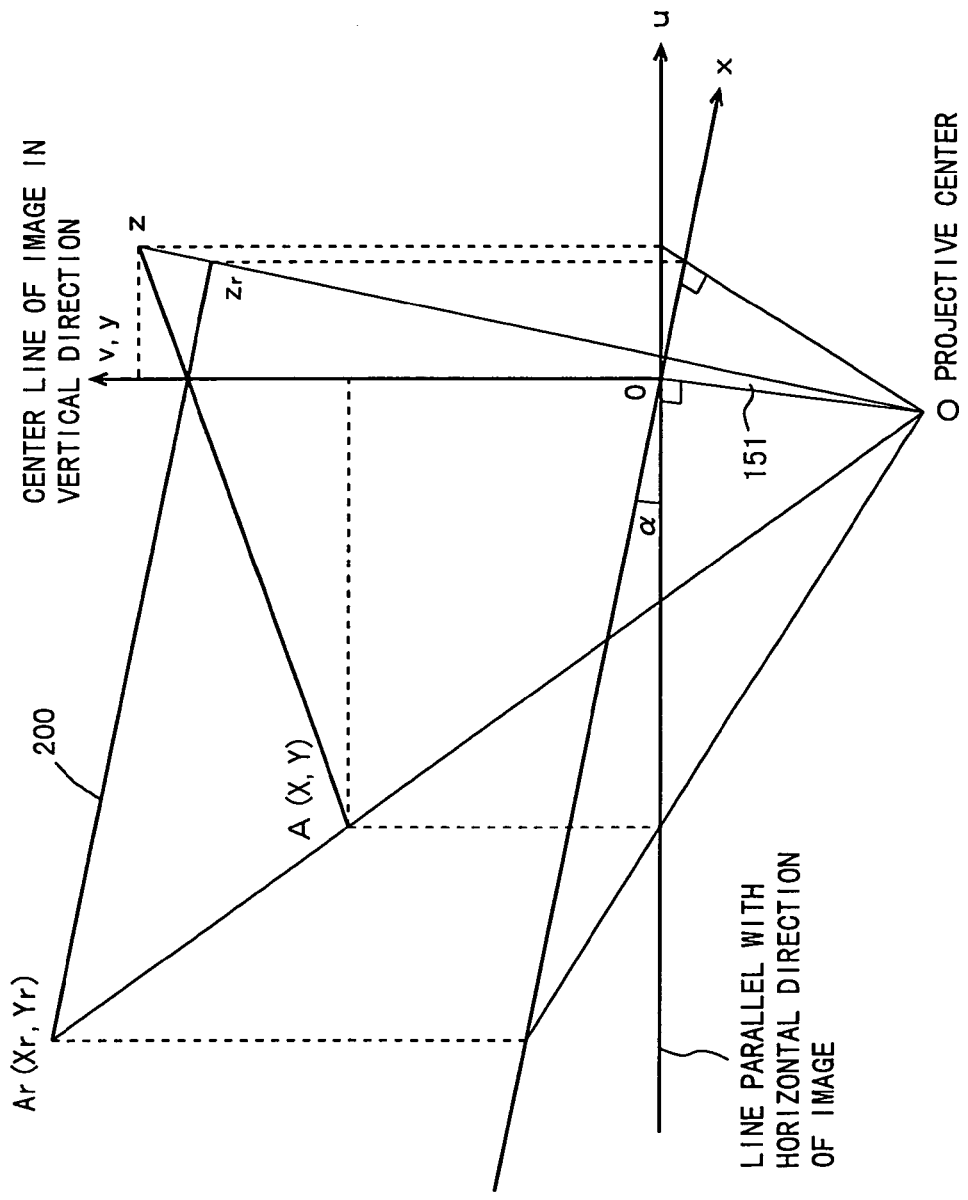
FIG. 17 is a diagram referenced for describing a principle of a swing rotation transformation.

Next, a principle of the swing rotation transformation will be described. FIG. 17 is a diagram referenced for describing a principle of the swing rotation transformation. With reference to FIG. 17, a u-v coordinate system represents the image coordinate system and an x-y coordinate system represents a surface of the original in real space where the original is placed. Light axis 151 runs through a projective center O and viewpoint o which is the origin of the image coordinate system. For the simplicity, the origins of the x-y coordinate system and the u-v coordinate system are shown overlapped. As to the relation between the x-y coordinate system and the u-v coordinate system, the y-axis and the v-axis overlap. The angle formed by the u-axis and the x-axis is horizontal swing angle α.

Now, representing one point A on the image coordinate system as coordinate (X, Y), a point where a straight line running through projective center O and point A crosses the plane of original (the x-y coordinate system) corresponds to a point Ar on the surface of original in the real space. Here, Ar is represented as coordinate (Xr, Yr). Similarly, a point Zr on the surface of the original in the real space corresponding to a point Z in the image coordinate system is the point where a straight line running through projective center O and point Z crosses the surface of the original (the x-y coordinate system).

When projected onto the image coordinate system, straight line ArZr in the real space would not be a straight line and becomes distorted. The degree of distortion decreases towards point A. As the distortion is very little, straight line AZ can be used as its approximation.

In this case, the relation between Xr and X is represented by the following expression (1) and the relation between Yr and Y is represented by the following expression (2).

$$Xr = X / (\cos \alpha ((X/H) \sin \alpha) \tag{1}$$

$$Yr = Y \cos \alpha / (\cos \alpha - (X/H) \sin \alpha) \tag{2}$$

Where, H is the distance to the original and when H is relatively short compared with the size of the original, the value of H does not need to be determined at high precision. Therefore, detection of the distance H can be performed with a sensor which is not expensive and easy to construct. In addition, when the distance of pick-up (object distance) can be inferred to some extent based on the magnification of zoom and a distance range where the camera can focus with regards to digital camera 1, though the precision of inferred pick-up distance object distance is not high, the inferred value can be assigned to H as the pick-up distance.

Though the expressions (1) and (2) are shown as the expressions of transformation concerning the swing in the horizontal direction, they are applicable to the swing in the vertical direction, as well. In this case, the horizontal swing angle α is replaced with vertical swing angle γ.

Figure 18:
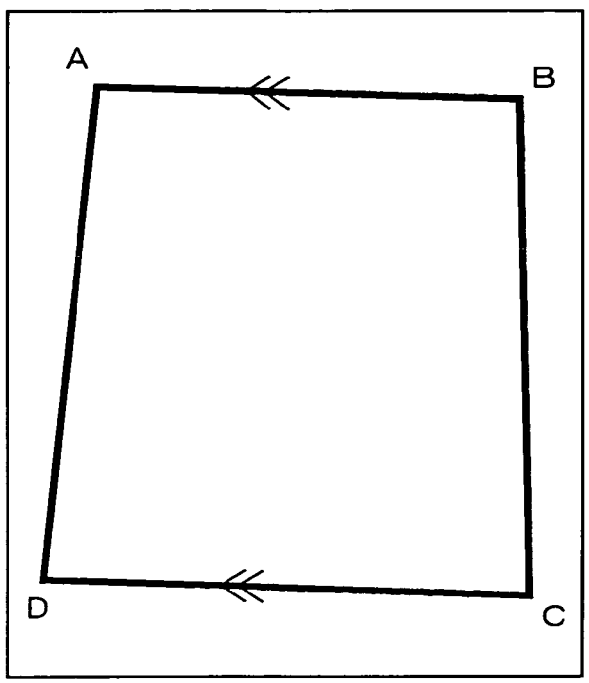
FIG. 18 shows a rectangle formed by a swing rotation transformation of a trapezoid ABCD shown in FIG. 15 in a horizontal direction.

FIG. 18 shows a rectangle formed by the swing rotation transformation of a trapezoid ABCD shown in FIG. 15 in a horizontal direction. With reference to FIGS. 15 and 18, in FIG. 18, a side AB is parallel with a side DC. A rectangle ABCD shown in FIG. 18 is obtained by performing the swing rotation transformation in the horizontal direction on trapezoid ABCD shown in FIG. 15 until the side AB and the side DC become parallel to each other. Hence, rectangle ABCD shown in FIG. 18 is approximately the same with a rectangle obtained by image pick-up of the original by digital camera 1 at the zero horizontal swing angle. Thus, the angle obtained by performing the swing rotation transformation in horizontal direction until the side AB and the side DC become parallel to each other is the horizontal swing angle.

Returning to FIG. 14, skew rotation angle β is calculated at step S104. Skew rotation angle β is calculated employing rectangle ABCD found at the calculation of horizontal swing angle α at step S103. Rectangle ABCD found at the calculation of horizontal swing angle α has the side AB and the side CD parallel to each other. Skew rotation angle β is a rotation angle formed by rotating the straight line crossing the side AB and the side CD at the right angle until the straight line becomes parallel to the direction that is perpendicular to the image.

Figure 19:
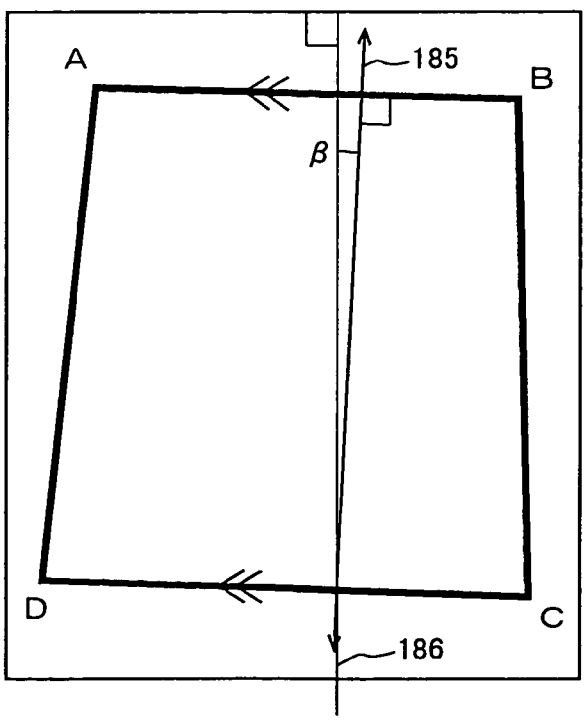
FIG. 19 is a diagram referenced for describing a rotation transformation performed to find skew rotation angle $\beta$.
Figure 20:
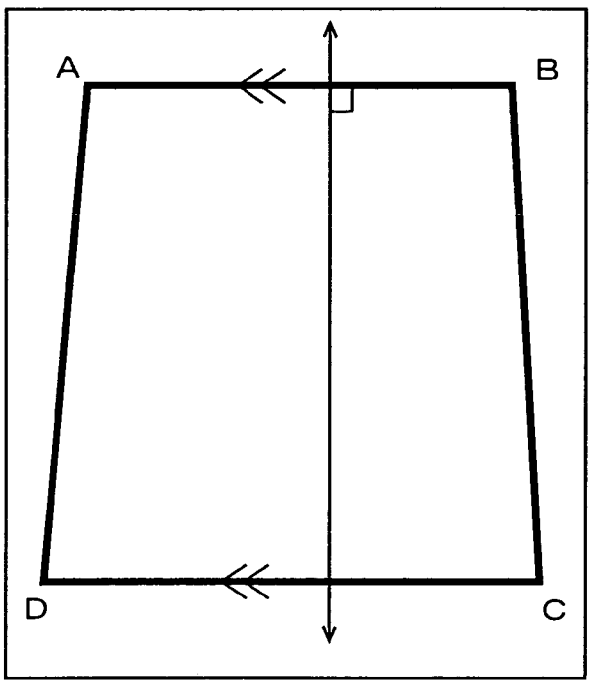
FIG. 20 shows a rectangle formed by a rotation transformation at a skew rotation angle $\beta$ of a rectangle formed by a swing rotation transformation at a horizontal swing angle $\alpha$.

FIG. 19 is a diagram referenced for describing a rotation transformation performed to find skew rotation angle β. With reference to FIG. 19, skew rotation angle β is formed by a straight line 185 crossing the side AB and the side CD of rectangle ABCD at the right angle and a straight line 186 running in the vertical direction of the image. This angle can be found by performing the rotation transformation of rectangle ABCD in the image plane until straight line 185 becomes parallel to straight line 186. FIG. 20 shows a rectangle formed by the rotation transformation at skew rotation angle β of a rectangle formed by the swing rotation transformation at horizontal swing angle α.

Figure 21:
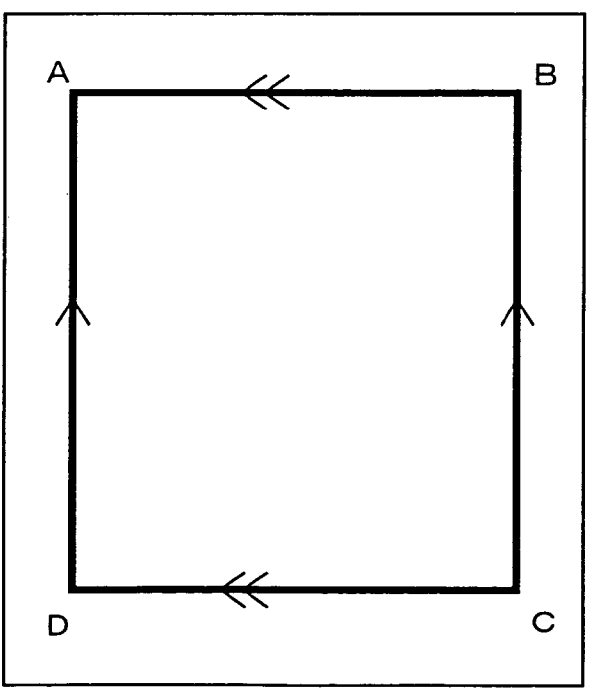
FIG. 21 shows a rectangle formed by a swing rotation transformation at a vertical swing angle $\gamma$ on a trapezoid formed by a rotation transformation at skew rotation angle $\beta$ on a trapezoid ABCD shown in FIG. 15.

Returning to FIG. 14, vertical swing angle γ is calculated at step S105. Vertical swing angle γ is a swing angle formed by performing the swing rotation transformation in the vertical direction after the rotation transformation at step S104 until the side AD and the side BC of trapezoid ABCD become parallel to each other. FIG. 21 shows a rectangle formed by the swing rotation transformation at vertical swing angle γ on the trapezoid formed by the rotation transformation at skew rotation angle β on trapezoid ABCD shown in FIG. 15.

At step S106 of FIG. 14, the geometrical transformation is performed on the input image employing the horizontal swing angle α found at step S103, the skew rotation angle β found at step S104 and the vertical swing angle γ found at step S105 and the resulting image is supplied as an output.

Thus, in the swing correction process, through the geometrical transformation of the input image employing horizontal swing angle α, vertical swing angle γ and skew rotation angle β, the swing distortion caused by horizontal swing angle α and vertical swing angle γ, as well as the rotation distortion caused by skew rotation angle β are corrected.

Figure 22:
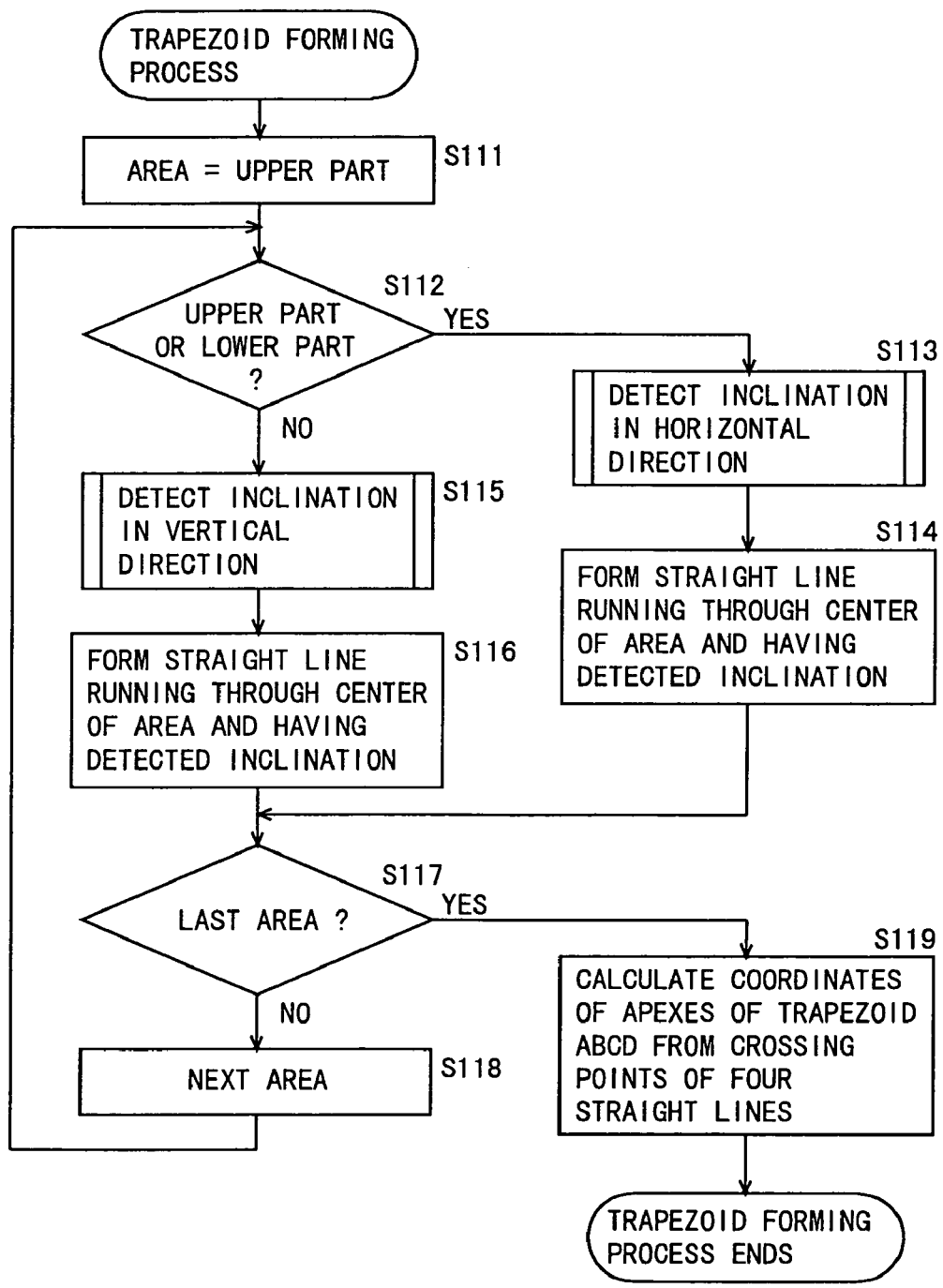
FIG. 22 is a flow chart showing a flow of a trapezoid formation process performed in step S102 of FIG. 14.

Next, the trapezoid forming process will be described. FIG. 22 is a flow chart showing a flow of a trapezoid formation process performed in step S102 of FIG. 14. With reference to FIG. 22, the upper partial image is selected as an area to be processed at step S11. Then, at step S112, it is determined whether the selected area is one of the upper partial image or the lower partial image or not. This is because processes performed on upper partial image 160 and lower partial image 170 and a process performed on left partial image 180 and right partial image 190 are different. When the selected partial image is the upper or the lower partial image, the process proceeds to step S113.

At step S113, the inclination detection process in the horizontal direction is performed. The inclination detection process in the horizontal direction is performed on upper partial image 160 and lower partial image 170. In the inclination detection process, the inclination of the object image from the horizontal direction included in upper partial image 160 and lower partial image 170 is detected. The inclination detection process in the horizontal direction will be described later in detail. At next step 114, a straight line running through the center of the partial image with the detected inclination is formed. Then, the straight line including the side AB in upper partial image 160 is formed and a straight line including the side CD in lower partial image 170 is formed.

When it is determined that the selected area is left partial image 180 or right partial image 190 at step S112, the process proceeds to step S115. At step S115, the inclination detection process in the vertical direction is performed. In the inclination detection process in the vertical direction, the inclination from the vertical direction of the object image included in left partial image 180 or right partial image 190 is detected. Then, at the next step S116, a straight line running through the center of the partial image with the detected inclination is formed. Thus, a straight line including the side AD in left partial image 180 is formed and a straight line including the side BC in right partial image 190 is formed.

At step S117, it is determined whether the process has been completed for all of upper, lower, left and right partial images. When the process is determined to have completed, the process proceeds to step S19 and, if not the process proceeds to step S118.

At step S118, a partial image on which the process has not been completed is selected as an area to be processed. Then the process proceeds to step S112 and the above-described process is repeated. Thus, a straight line running through a center of the partial image and having the inclination of the object included in the partial image area is formed for each of upper partial image 160, lower partial image 170, left partial image 180 and right partial image 190.

At step S119, coordinates of the apexes of trapezoid ABCD are found from the crossing points of four straight lines formed as described above. Thus the process completes.

Figure 23:
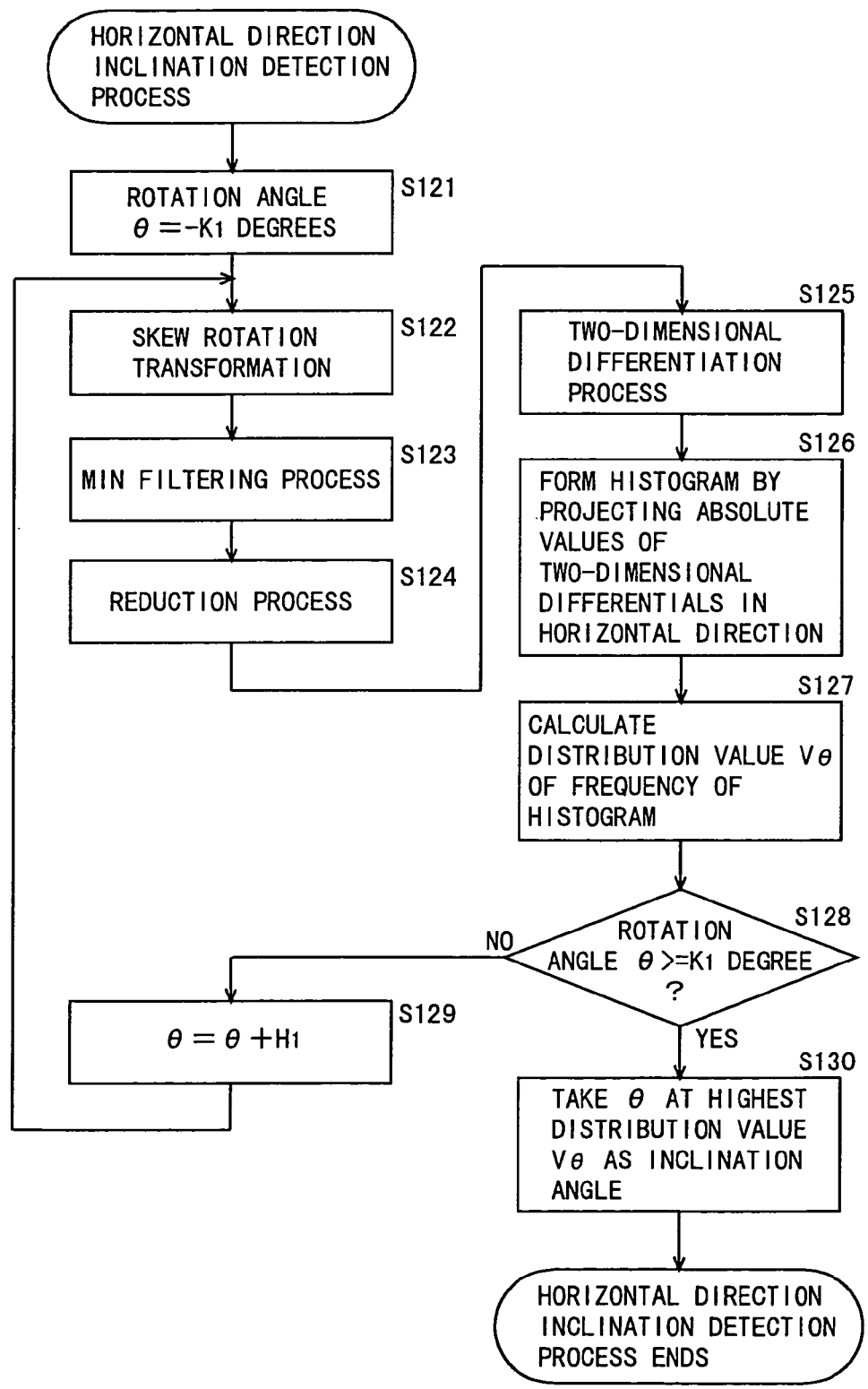
FIG. 23 is a flow chart showing a flow of a horizontal inclination detection process performed in step S113 of FIG. 22.

Next, the inclination detection process in the horizontal direction will be described. FIG. 23 is a flow chart showing a flow of a horizontal inclination detection process performed in step S113 of FIG. 22. With reference to FIG. 23, a variable θ representing the angle of rotation is set to −K1 degrees at step S121. Here, −K1 is an initial value of an integer. Angle of rotation θ represents a clockwise rotation direction when it is positive and represents a counterclockwise rotation direction when it is negative.

At step S122, a transformation is performed to rotate the selected partial area in the same plane by rotation angle θ. To the partial image after the rotation transformation, MIN filtering process is performed at step S123 and a reduction process is performed at step S124. The MIN filtering and reduction processes are performed to speed up the subsequent process, to reduce the memory required for the process and to facilitate the extraction of an edge in the horizontal direction by integrating the areas where characters are shown. Specifically, through the MIN filtering and reduction processes, the number of pixels to be processed decreases, whereby the number of data to be employed for the calculation decreases and high-speed processing can be achieved. In addition, as with the decrease in the number of data, the required memory can be reduced. In addition, as the area including characters becomes a cluster with black pixels being concatenated, a contour of the character area and not the edge of the character itself is extracted at the detection of edge. Here, reduction ratio can be modified according to pick-up distance, object whose image is to be picked up, required correction precision, process speed, limitation in memory capacity and so on.

At next step S125, the two-dimensional differentiation process is performed. Thus, an edge of the partial area obtained after the reduction process at step S124 is detected. The edge is, in other words, an edge of the object image included in the partial image.

Here, specific examples of MIN filtering process, reduction process and two-dimensional differentiation process will be shown. FIG. 24 shows an example of a reduced image of a portion of an area where characters of an input image are shown and FIG. 25 shows an image formed by performing a smoothing and an MIN filtering process on a reduced image shown in FIG. 24. With reference to FIG. 25, it can be seen that the area in which characters are shown becomes a cluster with the black pixels being concatenated. FIG. 26 shows an image formed by performing the two-dimensional differentiation process on an image shown in FIG. 25. With reference to FIG. 26, it can be seen that the contour part of the area in which characters are shown as a cluster in the image shown in FIG. 25 is extracted as an edge.

Returning to FIG. 23, at step S126 with respect to the image obtained after the two-dimensional differentiation process at step S125, a histogram is formed by projecting the sum of the absolute values of two-dimensional differentials in the horizontal direction. Then, distribution value Vθ of frequency of the formed histogram is calculated (S127). It is then determined whether the rotation angle θ is at least K1 degrees or not (S128). When rotation angle θ is equal to or larger than K1 degrees, process proceeds to step S130 and if not process proceeds to step S129.

At step S129, a step width H1 degree is added to rotation angle θ. Then the process proceeds to step S122 and the process from step S122 to step S127 is performed. Thus the rotation angle θ is changed in the range of –K1 to K1 by the step width H1, and distribution value Vθ of frequency of the histogram at each rotation angle is found. Then, a rotation angle θ at which distribution value Vθ is the highest is detected as the inclination angle in the horizontal direction (S130). Thus, with regard to upper partial image 160 and lower partial image 170, the inclination of the object included in each of partial images is found.

The inclination detection process in the horizontal direction shown in FIG. 23 can be applied to the inclination detection process in the vertical direction performed in step S115 of FIG. 22. The direction of the inclination to be detected is different, that is, the horizontal direction in one process and the vertical direction in another. Hence, in the inclination detection process in the vertical direction in step S126 of FIG. 23, a histogram is formed by projecting the sum of absolute values of two-dimensional differentials in the vertical direction and not in horizontal direction. In other respect, the process is same with the inclination detection process in the horizontal direction.

A specific example of the inclination detection process in the vertical direction on left partial image 180 will be described. FIG. 27A shows a two-dimensional differential image 180A obtained by performing the MIN filtering process, the reduction process and the two-dimensional differentiation process on left partial image 180. FIG. 27B shows a histogram formed by projecting the sum of the absolute values of two-dimensional differential values of two-dimensional differential image 180A in the vertical direction.

FIG. 28A shows a two-dimensional differential image 180B obtained by performing the MIN filtering process, the reduction process and the two-dimensional differentiation process on an image obtained by rotating left partial image 180 by rotation angle θ. FIG. 28B shows a histogram obtained by projecting the sum of the absolute values of the two-dimensional differential values of two-dimensional differential image 180B in the vertical direction.

Here, comparing two-dimensional differential image 180A shown in FIG. 27A and two-dimensional differential image 180B shown in FIG. 28A, it is found that an edge in two-dimensional differential image 180A is not aligned in the vertical direction and inclined, whereas an edge in two-dimensional differential image 180B is aligned in the vertical direction. Next, the histogram of FIG. 27B is compared with the histogram of FIG. 28B. As there is no deviation in frequency in the histogram shown in FIG. 27B, the distribution of the frequency of the histogram is low. Conversely, the histogram shown in FIG. 28B has a peak with high frequency on the left side along the axis of horizontal position and the deviation in frequency exists. Thus the distribution of frequency of the histogram is high.

Thus, the high distribution of the frequency of the histogram showing the projection of the sum of the absolute values of two-dimensional differential values of the two-dimensional differential image in the vertical direction indicates the alignment of the edges shown in the two-dimensional differential image in the vertical direction. Similarly, the high distribution of the frequency of the histogram showing the projection of the sum of the absolute values of two-dimensional differential values of the two-dimensional differential image in the horizontal direction indicates the alignment of the edges shown in the two-dimensional differential image in the horizontal direction.

Though in this embodiment, the MIN filtering process and the reduction process are employed in combination, for the integration of the area in which characters are shown, these processes can be employed independently. In addition, the smoothing, the brightness MIN filtering process, morphology operation, or the like can be employed separately or in combination with the reduction process. When the smoothing, the brightness MIN filtering process, or the morphology operation is employed, the use of different filters in horizontal and vertical directions is effective. For example, when the smoothing process is performed in the horizontal direction, smoothing is not performed in the vertical direction and the integration of the area is performed in the horizontal direction. Then, the detection of the edge in the vertical direction is facilitated.

In addition, in the inclination detection process in the horizontal direction at the reduction process, reduction may be performed only in the horizontal direction and not in the vertical direction. Conversely, it is possible to perform the reduction only in the vertical direction and not in the horizontal direction at the inclination detection process in the vertical direction. Then the detection of the edge in horizontal or vertical direction is facilitated.

Figure 29:
FIG. 29 shows an example of an image formed by performing a smoothing and an MIN filtering process on a reduced image shown in FIG. 24 such that a block is longer in vertical direction than in horizontal direction.
Figure 30:
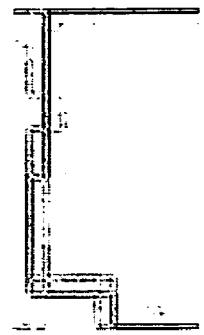
FIG. 30 shows a two-dimensional differential image found by performing a two-dimensional differentiation process on an image shown in FIG. 29.

FIG. 29 shows an example of an image formed by performing smoothing and MIN filtering process on the reduced image shown in FIG. 24 such that a block is longer in vertical direction than in horizontal direction. FIG. 30 shows a two-dimensional differential image found by performing the two-dimensional differentiation process on the image shown in FIG. 29.

An image shown in FIG. 29 has approximately the same number of pixels as the image shown in FIG. 25. A two-dimensional differential image shown in FIG. 30 has a clear edge in the vertical direction as can be seen from the comparison with the two-dimensional differential image shown in FIG. 26. Thus, clearer contour of the area can be captured when filters with different frequency are used in horizontal and vertical directions in the process.

Figure 31:
FIG. 31 shows an example of an input image.
Figure 32:
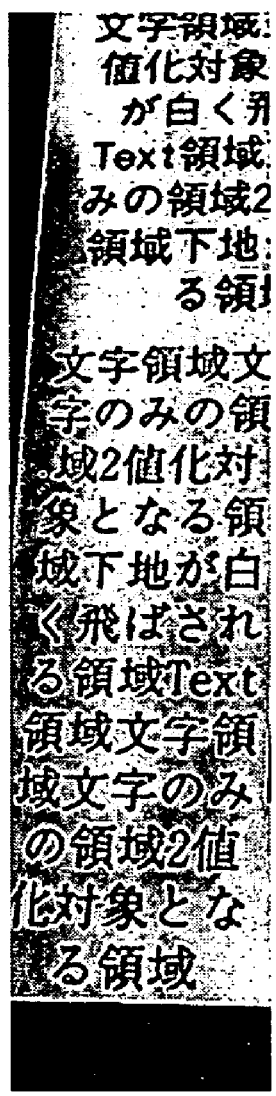
FIG. 32 shows a left partial image constituting a left-hand part of and one-fourth an input image shown in FIG. 31.
Figure 33:
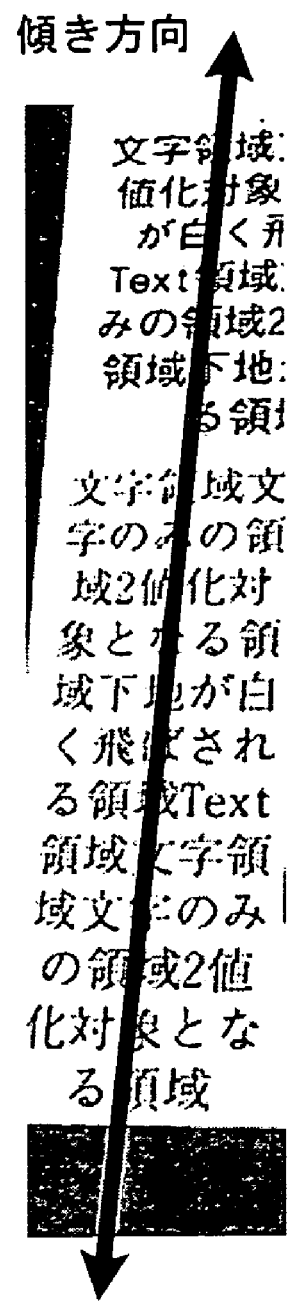
FIG. 33 is a view showing an inclination of a left partial image shown in FIG. 32.

FIG. 31 shows an example of an input image. With reference to FIG. 31, an original is included in the input image. FIG. 32 shows a left partial image constituting a left-hand part of and one-fourth an input image shown in FIG. 31. FIG. 33 is a view showing an inclination of a left partial image shown in FIG. 32. With reference to FIGS. 32 and 33, the inclination of the object image is found for each partial image and the straight line running through the center of the partial image at the found inclination is formed.

Figure 34:
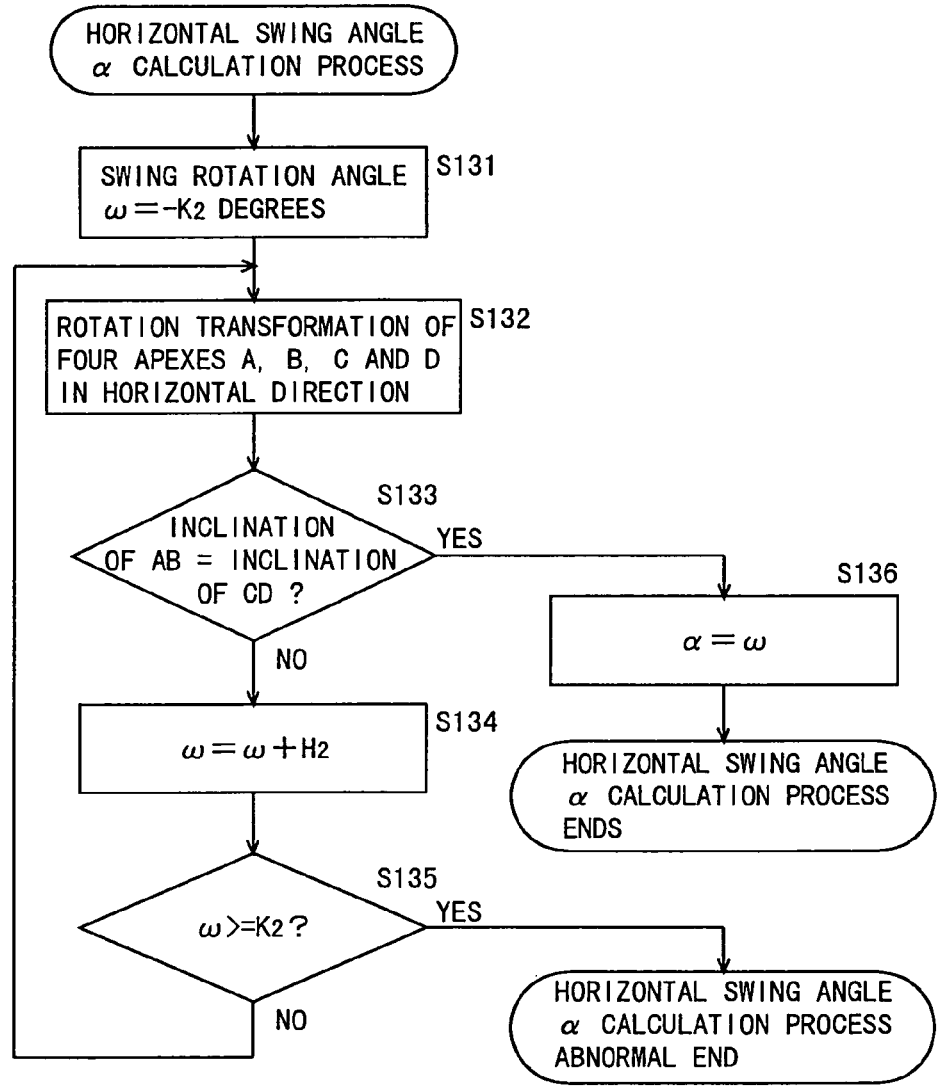
FIG. 34 is a flow chart showing a flow of a horizontal swing angle $\alpha$ calculation process performed in step S103 of FIG. 14.

Next, the horizontal swing angle α calculation process will be described. FIG. 34 is a flow chart showing a flow of a horizontal swing angle α calculation process performed in step S103 of FIG. 14. With reference to FIG. 34, a swing rotation angle ω which is a variable representing the horizontal swing angle is set to an initial value −K2 degrees (S131). At next step S132, the swing rotation transformation is performed in the horizontal direction at swing rotation angle ω on four apexes A, B, C and D of trapezoid ABCD found in the trapezoid forming process.

At next step S133, it is determined whether the inclination of the side AB and the inclination of the side CD are the same or not. If they are same, the process proceeds to step S136 and if not the process proceeds to step S134. At step S136, a value of swing rotation angle ω at which the inclination of the side AB and the inclination of the side CD are equal is substituted for horizontal swing angle α. Thus the horizontal swing angle calculation process completes.

At step S134, a step width H2 degree is added to swing rotation angle ω. Then at step S135, it is determined whether swing rotation angle ω is equal to or larger than K2 degrees or not. When swing rotation angle ω is equal to or larger than K2 degrees, the process is ended and it is determined that the horizontal swing angle calculation process is abnormally ended. When swing rotation angle ω is less than K2 degrees, the process proceeds to step S132 and the process described above is repeated.

Thus, the swing rotation transformation is performed in the horizontal direction at a swing rotation angle ω while changing the swing rotation angle ω in the range from −K2 to K2 by step width H2. A value of swing rotation angle ω at which the inclination of the side AB and the inclination of the side CD are same is the horizontal swing angle α.

Figure 35:
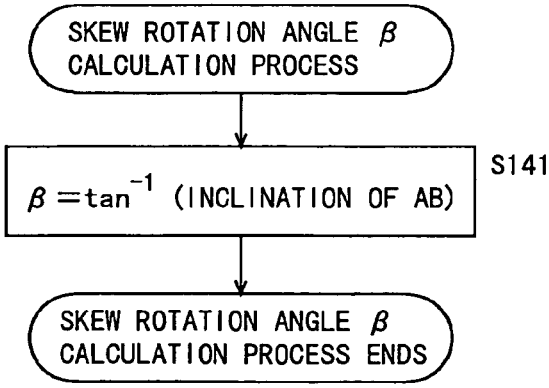
FIG. 35 is a flow chart showing a flow of a skew rotational angle β calculation process performed in step S104 of FIG. 14.

Next, the skew rotation angle β calculation process will be described. FIG. 35 is a flow chart showing a flow of a skew rotational angle β calculation process performed in step S104 of FIG. 14. With reference to FIG. 35, at step S141, skew rotation angle β is found from the inclination of the side AB among four apexes ABCD. Thus the side AB and the side DC become parallel to the horizontal direction of the image.

Figure 36:
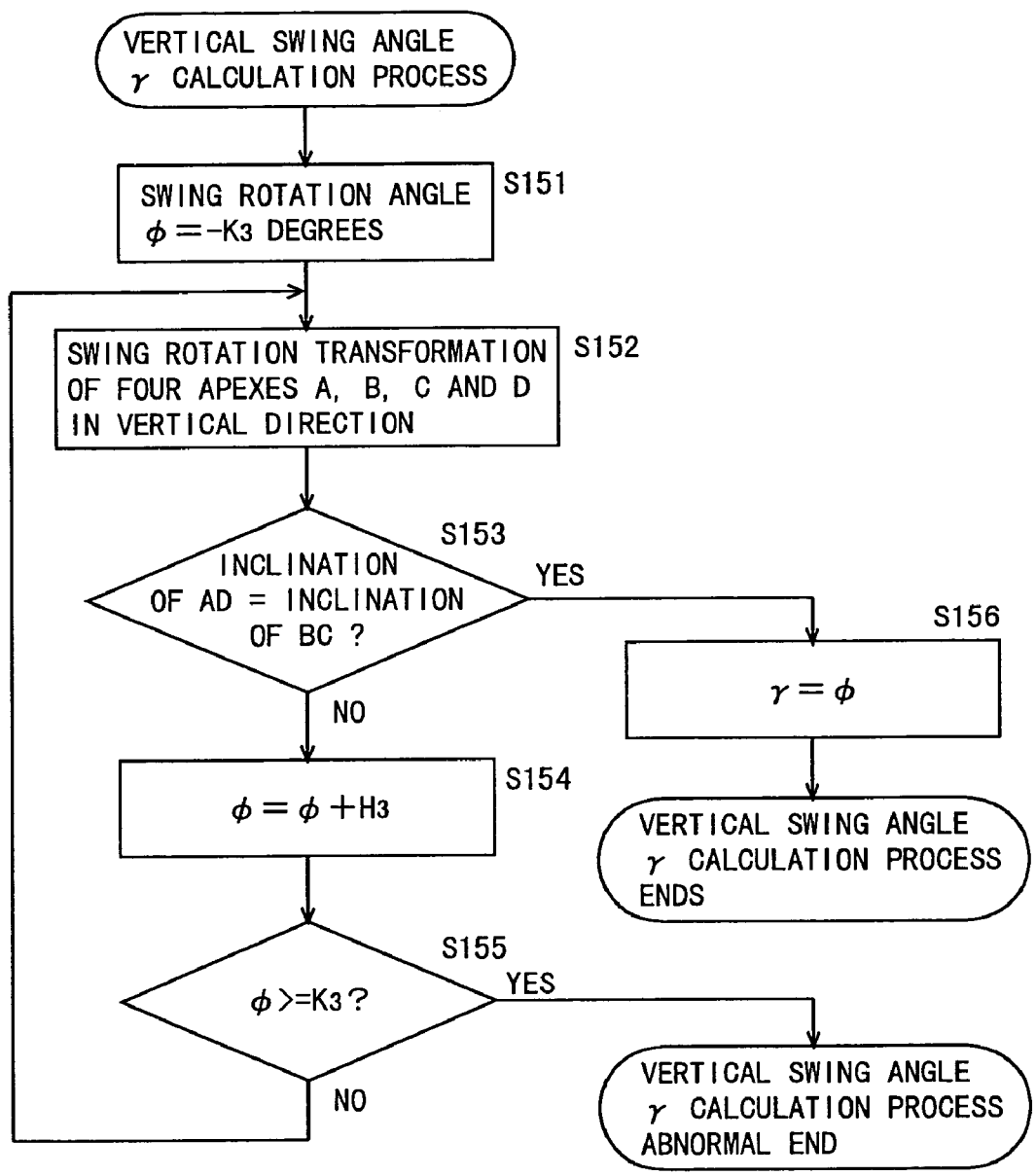
FIG. 36 is a flow chart showing a flow of a vertical swing angle γ calculation process performed in step S105 of FIG. 14.
Figure 37:
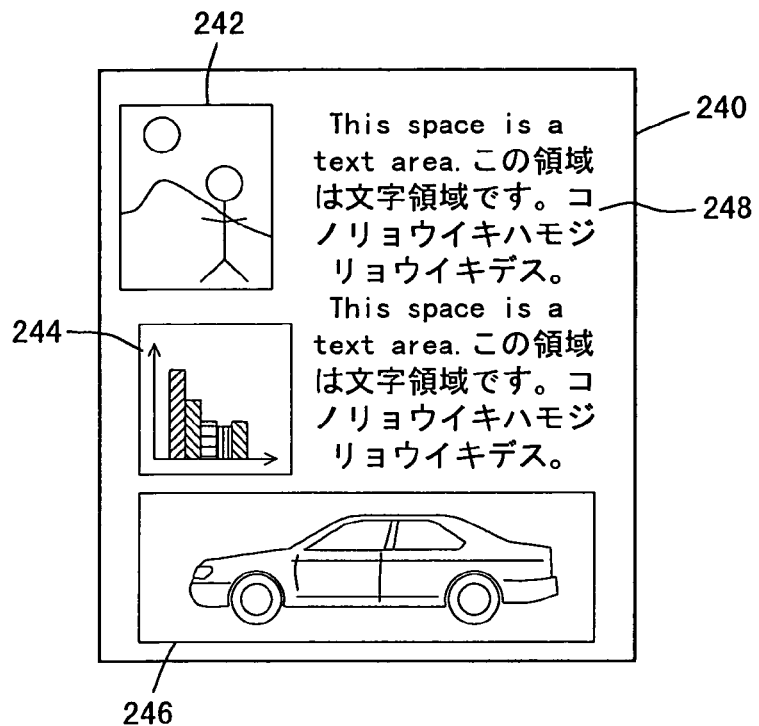
FIG. 37 shows an image with no inclination obtained by image pick-up of an original by a digital camera.
Figure 38:
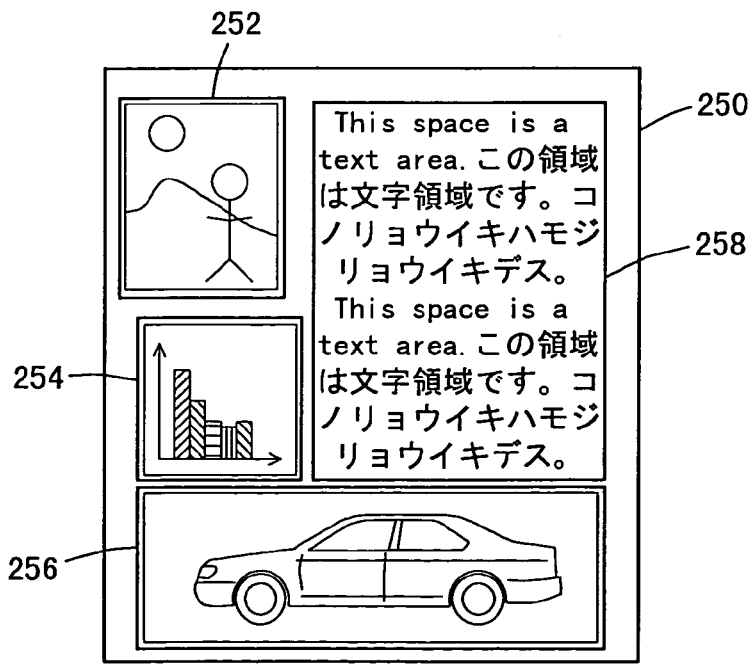
FIG. 38 shows an image obtained by performing an area determination process on an image of FIG. 37.
Figure 39:
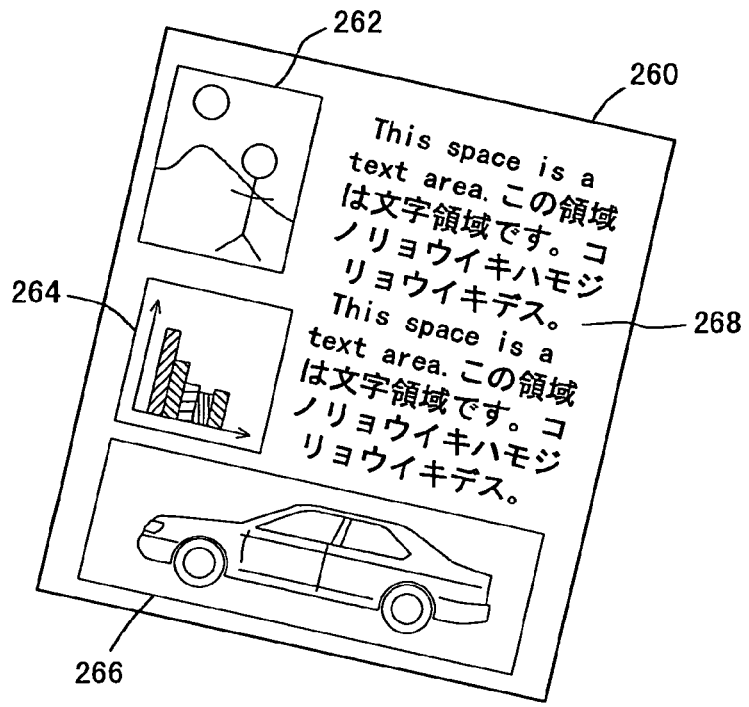
FIG. 39 shows an image with a rotational shift obtained by image pick-up of an original by a digital camera.
Figure 40:
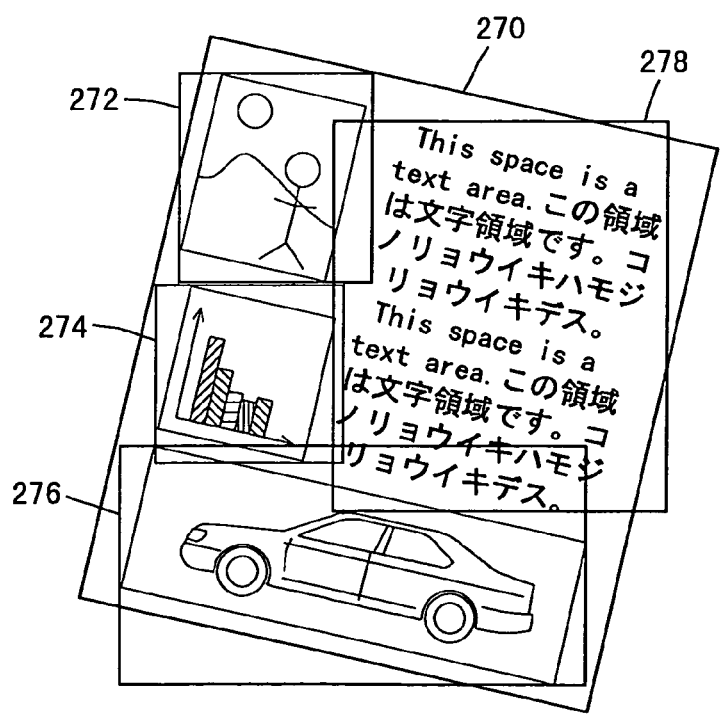
FIG. 40 shows an image obtained by performing an area determination process on an image of FIG. 39.
Figure 41:
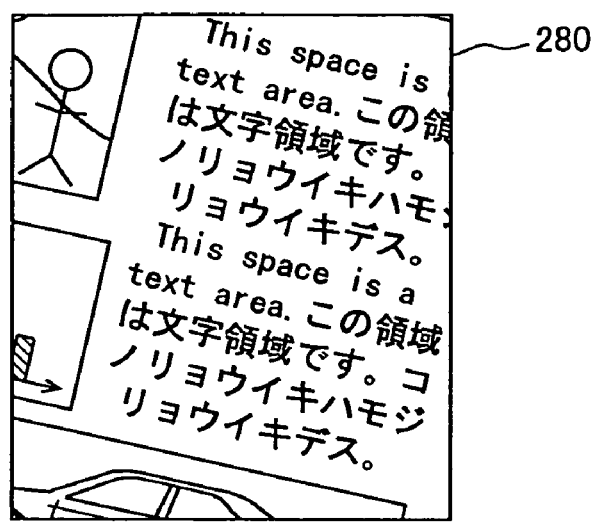
FIG. 41 shows an image which is obtained by image pick-up of an original by a digital camera and does not include an edge of the original therein.
Figure 42:
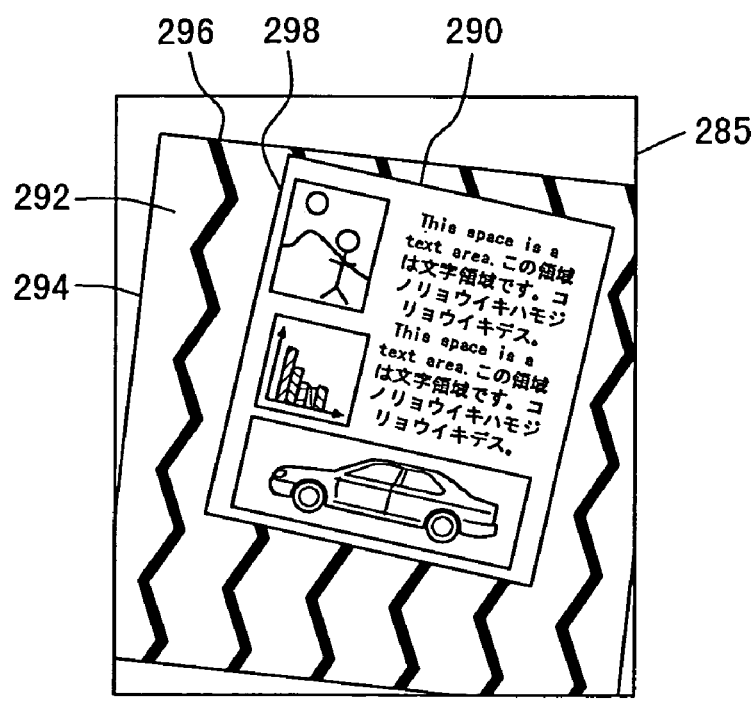
FIG. 42 shows an image which is obtained by image pick-up of an original by a digital camera and includes a desk as a background of the original therein.
Figure 43:
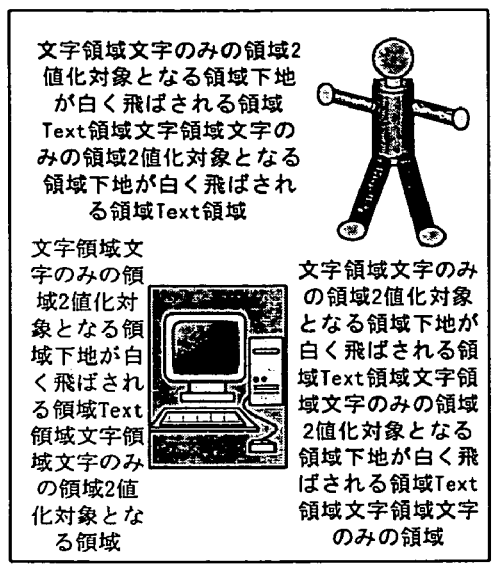
FIG. 43 shows an example of an original which is to be an object of image pick-up by a digital camera.
Figure 44:
FIG. 44 shows an example of an image obtained by image pick-up of an original shown in FIG. 43 by a digital camera and not including an edge of the original.
Figure 45:
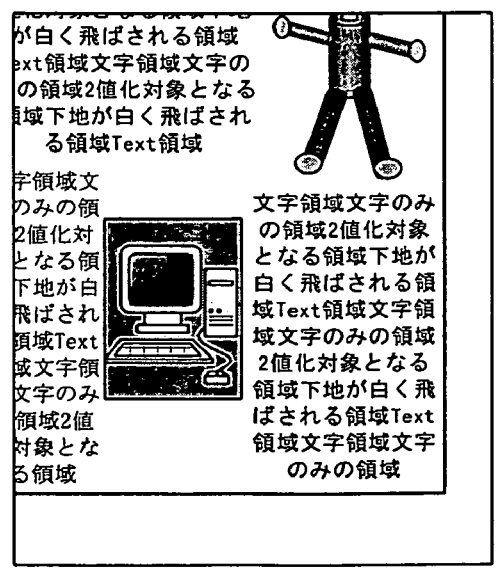
FIG. 45 shows an example of an image obtained by image pick-up of an original shown in FIG. 43 by a digital camera and including a part of an edge of the original.

Next, the vertical swing angle γ calculation process will be described. FIG. 36 is a flow chart showing a flow of a vertical swing angle γ calculation process performed in step S105 of FIG. 14. With reference to FIG. 36, at step S151, a swing rotation angle φ, which is a variable representing the swing rotation angle, is set to initial value −K3 degrees. At next step S152, the swing rotation transformation is performed in the vertical direction at swing rotation angle φ on four apexes ABCD. Then, it is determined whether the inclination of the side AD and the inclination of the side BC after the swing rotation transformation are equal or not (S153). If the inclination of the side AD and the inclination of the side BC are equal, the process proceeds to step S156, if not, the process proceeds to step S154. At step S156, a value of swing rotation angle φ at the time of the swing rotation transformation rendering the inclination of the side AD and of the side BC equal to each other is taken as vertical swing angle γ. Thus the vertical swing angle γ calculation process completes.

At step S154, step width H3 degree is added to swing rotation angle φ. At next step S155, it is determined whether swing rotation angle φ is equal to or larger than an upper limit value K3 degree or not. If swing rotation angle φ is equal to or larger than the upper limit value K3, the vertical swing angle calculation process is determined to be abnormal and the process is ended. If swing rotation angle φ is smaller than K3 degree, the process proceeds to step S152 and the above-described step will be repeated.

As can be seen from the foregoing, in digital camera 1 according to the embodiment, an object in a picked-up image is not extracted and a trapezoid is formed based on an angle of inclination of an object detected for each of upper, lower, left and right partial images of the image, the swing rotation transformation is performed on the trapezoid such that the trapezoid is turned to a rectangle, and the swing angle is detected, whereby the distortion of the image caused by the swing can be corrected even if the object does not exist in the image.

In addition, as only the coordinates of the apexes are employed at the swing rotation transformation of the trapezoid, the process speed is high and the swing angle can be correctly found.

In addition, as the swing angle is found by performing the swing rotation transformation such that the trapezoid is turn to a rectangle, the degree of correction of the distortion of the image caused by the swing can be determined, whereby the precision of the correction can be enhanced.

Still further, as an image with different reduction ratios in horizontal and vertical directions or an image processed by different filter at horizontal and vertical directions are employed to find the inclination of the object image included in each of the upper, lower, left and right partial images, the process speed can be fastened with no effect on the precision.

Here, a program for performing the processes shown in FIGS. 14, 22, 23, 34, 35 and 36 may be recorded in recording medium 124, the recorded program may be read by external storage device 122, and performed by CPU 100. Recording medium 124 can be an optical magnetic recording disc, a digital video disc (DVD) or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:
an image receiving unit to receive an original image data;
an edge detection unit to detect an edge data included in an image data related to said received original image data;
a rotation unit to rotate said detected edge data;
an operation unit to derive a characteristic amount of said rotated edge data; and
an inclination detection unit to detect an inclination angle of said received original image data based on said derived characteristic amount.

2. The image processing device according to claim 1 further comprising:
a reduction unit to reduce said received original image data; wherein
said edge detection unit detects an edge data included in said reduced image data.

3. The image processing device according to claim 1 further comprising:
an inclination correction unit to correct the inclination of said received original image data based on said detected inclination angle.

4. The image processing device according to claim 1 wherein
said edge detection unit detects said edge data by differentiating said reduced image data with a filter.

5. The image processing device according to claim 4 wherein
said edge detection unit uses different filters for finding an edge data in a horizontal direction and for finding an edge data in a vertical direction.

6. The image processing device according to claim 1 wherein
said operation unit forms a histogram by projecting said detected edge data in a predetermine direction, and
said characteristic amount is a distribution of said formed histogram.

7. The image processing device according to claim 6 wherein
said predetermined direction includes a vertical direction and a horizontal direction of said original image data.

8. The image processing device according to claim 2 further comprising: a camera to pick up an image of an original; wherein
the image data received by said image receiving unit is an image picked up by said camera.

9. An image processing device comprising:
an image receiving unit to receive an original image data;
a process image forming unit to form an image data to be processed based on said received original image data;
a geometric transformation unit to perform a swing rotation transformation on said formed image data using an angle as a parameter;
a first inclination detection unit to detect a first inclination of a first area in said formed image data;
a second inclination detection unit to detect a second inclination of a second area opposing said first area in said formed image data; and
a swing correction unit to perform a swing rotation transformation on said received original image data based on said first inclination and said second inclination.

10. The image processing device according to claim 9 further comprising:
a comparison unit to compare said first inclination and said second inclination; wherein
said swing correction unit performs said swing rotation formation based on the comparison by said comparison unit.

11. The image processing device according to claim 9 further comprising:
a third inclination detection unit to detect an inclination of a left side area in said formed image data;
a fourth inclination detection unit to detect an inclination of a right side area in said formed image data; wherein
said first area is an upper side area in said formed image data,
said second area is a lower side area in said formed image data,
said processing image forming unit forms a rectangular formed by straight lines with detected inclinations of said upper side area, said lower side area, said left side area and said right side area, respectively,
said geometric transformation unit transforms coordinates of apexes of said formed rectangular image.

12. An image processing device comprising:
an image receiving unit to receive an original image data obtained with a camera picking up an original image;
a swing correction unit to correct distortion of an image caused by a swing of said camera with respect to the original image; and
a skew correction unit to correct distortion of an image caused by a skew of said camera with respect to the original image.

13. The image processing device according to claim 12 wherein
said skew correction unit corrects the distortion of the image corrected by said swing correction unit.

14. The image processing device according to claim 12 further comprising:
an inclination detection unit to detect an inclination of each of a plurality of portions in said received original image data wherein
said swing correction unit and said skew correction unit correct distortion of said received original image data based on said detected inclinations.

15. The image processing device according to claim 12 further comprising:
an image reduction unit to reduce said received original image data; and
an inclination detection unit to detect an inclination of each of a plurality of portions of said reduced image data; wherein
said swing correction unit and said skew correction unit correct a distortion of said received original image data based on said detected inclinations.

16. The image processing device according to claim 12 further comprising:
a process image forming unit to form an image to be processed based on said received original image data;
a first swing angle detection unit to detect a swing angle in a first direction of said received original image data by performing a geometric transformation on said image to be processed;
a skew angle detection unit to detect a skew angle of said received original image data by performing the geometric transformation on the image subjected to the geometric transformation by said first swing angle detection unit; and
a second swing angle detection unit to detect a swing angle in a second direction of said received original image data by performing the geometric transformation on the image subjected to the geometric transformation by said skew angle detection unit; wherein
said swing correction unit corrects said received original image data based on the detected swing angle in said first direction and the detected swing angle in said second direction;
said skew correction unit corrects said received original image data based on said detected skew angle.

17. An image processing method comprising the steps of:
receiving an original image data;
detecting an edge data included in an image data to be processed related to said received original image data;
rotating said detected edge data;
deriving a characteristic amount of said rotated edge data; and
correcting an inclination of said received original image data based on said derived characteristic amount.

18. The image processing method according to claim 17, said image data to be processed is said received original image data.

19. The image processing method according to claim 17, further comprising the step of;
reducing said received original image data; wherein said image data to be processed is said reduced original image data.

* * * * *